US011929938B2

(12) United States Patent
Sharma et al.

(10) Patent No.: US 11,929,938 B2
(45) Date of Patent: Mar. 12, 2024

(54) EVALUATING OVERALL NETWORK RESOURCE CONGESTION BEFORE SCALING A NETWORK SLICE

(71) Applicant: Telefonaktiebolaget LM Ericsson (publ), Stockholm (SE)

(72) Inventors: Nipun Sharma, New Delhi (IN); Rakesh Bajpai, New Delhi (IN); Tushar Sabharwal, New Delhi (IN); Hans Eriksson, Sollentuna (SE); Rajiv Bhardwaj, Jalandhar (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 123 days.

(21) Appl. No.: 17/620,675

(22) PCT Filed: Jun. 19, 2019

(86) PCT No.: PCT/SE2019/050591
§ 371 (c)(1),
(2) Date: Dec. 18, 2021

(87) PCT Pub. No.: WO2020/256605
PCT Pub. Date: Dec. 24, 2020

(65) Prior Publication Data
US 2023/0146433 A1   May 11, 2023

(51) Int. Cl.
G06F 15/16    (2006.01)
H04L 47/70    (2022.01)
H04L 47/74    (2022.01)

(52) U.S. Cl.
CPC .......... H04L 47/745 (2013.01); H04L 47/822 (2013.01)

(58) Field of Classification Search
CPC ........................... H04L 47/745; H04L 47/822
See application file for complete search history.

(56) References Cited

U.S. PATENT DOCUMENTS

2017/0208019 A1* 7/2017 Shimojou ............... H04L 47/82
2018/0123961 A1* 5/2018 Farmanbar .......... H04L 47/2408
(Continued)

FOREIGN PATENT DOCUMENTS

EP       3461087 A1    3/2019
WO   WO 2018173808 A1   9/2018

OTHER PUBLICATIONS

International Search Report and Written Opinion of the International Searching Authority, PCT/SE2019/050591, dated May 4, 202, 19 pages.

Primary Examiner — Hieu T Hoang
(74) Attorney, Agent, or Firm — Sage Patent Group

(57) ABSTRACT

A first network node in a communication network can evaluate whether to scale a first resource of a network slice of the communication network. The first network node can receive, from a second network node of the communication network, a first message indicating a request for approval to scale the first resource of the network slice. Responsive to receiving the first message, the first network node can determine whether to scale the first resource of the network slice based on information regarding a second resource. The first and second resources may be of different types. The first network node can transmit, to the second network node, a second message indicating whether to scale the first resource of the network slice based on determining whether to scale the first resource of the network slice. Related methods are also discussed.

20 Claims, 25 Drawing Sheets

(56) References Cited

U.S. PATENT DOCUMENTS

| | | | |
|---|---|---|---|
| 2019/0082326 A1* | 3/2019 | Mathison | H04W 8/18 |
| 2019/0123963 A1* | 4/2019 | Tang | H04L 45/64 |
| 2020/0052991 A1* | 2/2020 | Kodaypak | H04L 47/6265 |
| 2021/0218679 A1* | 7/2021 | Chong | H04W 72/543 |
| 2021/0250251 A1* | 8/2021 | Fan | H04L 41/14 |
| 2021/0306235 A1* | 9/2021 | Al-Dulaimi | H04L 41/0654 |

* cited by examiner

| Application Function | Time | Load | Service Deterioration |
|---|---|---|---|
| AF Server 1 | 2018-10-13: 05:15:00 | 90% | No |
| AF Server 2 | 2018-10-13: 05:15:00 | 95% | Yes |
| AF Server 3 | 2018-10-13: 05:15:00 | 91% | No |

FIG. 23

| Network Slice | Day1 | Day2 | Day3 |
|---|---|---|---|
| NS1 | 2 AMF, 4 SMF, 11 UPF | 2 AMF, 5 SMF, 11 UPF | 2 AMF, 5 SMF, 10 UPF |
| NS2 | 1 AMF, 1 SMF, 2 UPF | 2 AMF, 2 SMF, 2 UPF | 2 AMF, 2 SMF, 2 UPF |
| NS3 | 8 AMF, 16 SMF, 4 UPF | 8 AMF, 18 SMF, 4 UPF | 8 AMF, 18 SMF, 6 UPF |

FIG. 24

| Events | Timestamp | NFs | Decision | Duration (Hrs) |
|---|---|---|---|---|
| Scaling Request | Weekday 09:00 PM | AMFx | Scaled | 2 |
| Congestion | Everyday 08:30 PM | VirtualSwitchY | Improvable, Scaled | 2.5 |
| Unimprovable Congestion | Weekly Sat 11:00 PM | BGWx | Unimprovable, not-scaled | 0.15 |

FIG. 25

EVALUATING OVERALL NETWORK RESOURCE CONGESTION BEFORE SCALING A NETWORK SLICE

CROSS REFERENCE TO RELATED APPLICATIONS

This application is a 35 U.S.C. § 371 national stage application of PCT International Application No. PCT/SE2019/050591 filed on Jun. 19, 2019, the disclosure and content of which is incorporated by reference herein in its entirety.

TECHNICAL FIELD

The present disclosure relates generally to communication, and more particularly to operations in a communication network and related nodes of the communication network.

BACKGROUND 5G introduced Network Slices or Network Slice Selection Assistance Information ("NSSAI"). With 5G there is an option to create different network slices for different requirements. A public land mobile network ("PLMN") combines different 5G core network elements to deliver much more flexible type of network slices (or NSSAIs), and these network slices can be delivered in real time based on S-NSSAIs values provided in the N1 interface.

The 5GC is responsible for selection of a Network Slice instance to serve a user equipment or wireless device ("UE"), the 5GC Control Plane ("CP"), and user plane ("UP") network functions ("NF") corresponding to the network slice instance. A network slice can be scaled dynamically based on the requirements of the subscribers connected to that network slice. A network slice can be scaled by scaling individual virtual network function ("VNFs").

VNF instance scaling can be the result of a service quality threshold being crossed—whether because service quality is no longer acceptable, requiring expanding capacity, or because service quality and utilization is such that capacity can be contracted without affecting quality delivered.

The scaling use cases can be grouped in 3 categories: Auto-scaling, on-demand scaling, and scaling based on management request. Auto-scaling can occur in response to the VNF Manager monitoring the state of a VNF instance and triggering the scaling operation when certain conditions are met. For monitoring a VNF instance's state, it can for instance track infrastructure-level and/or VNF-level events. Infrastructure-level events can be generated by the VIM. VNF-Level events may be generated by the VNF instance or its EM. On-demand scaling, can occur when a VNF instance or its EM monitor the state of a VNF instance and trigger a scaling operation through explicit request to the VNF Manager. Scaling based on management request can occur where the scaling request is triggered by some sender (e.g., operations support systems ("OSS")/business support systems ("BSS") or operator) towards VNFM via the NFVO.

In some examples, there may be a requirement to increase the resources/capacity for a network slice. This decision can be based on the available resources under Virtualized Infrastructure Manager ("VIM") and can be static in nature.

SUMMARY

According to some embodiments, a method of operating a first network node in a communication network to evaluate whether to scale a first resource of a network slice of the communication network is provided. The method includes receiving, from a second network node of the communication network, a first message indicating a request for approval to scale the first resource of the network slice. The method further comprises, responsive to receiving the first message, determining whether to scale the first resource of the network slice based on information regarding a second resource. The first and second resources can be of different types. The method can further include transmitting, to the second network node, a second message indicating whether to scale the first resource of the network slice based on determining whether to scale the first resource of the network slice.

According to some other embodiments, a method of operating a first network node, in a communication network to respond to congestion in a resource of a network slice of the communication network is provided. The method includes determining that the resource of the network slice is congested. The method further includes, responsive to determining that the resource of the network slice is congested, transmitting a first message to a second network node of the communication network. The first message can indicate a request for approval to scale the resource of the network slice. The method can further include receiving a second message from the second network node. The second message can indicate whether to scale the resource of the network slice in response to the first message.

Various embodiments described herein can improve resource management and/or reduce congestion of resources in a network slice of a communications network.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 23 is a table illustrating an example of application function load information according to some embodiments of the present disclosure;

FIG. 24 is a table illustrating an example of change of resources with time according to some embodiments of the present disclosure;

FIG. 25 is a table illustrating an example of historical data for planning according to some embodiments of the present disclosure;

DETAILED DESCRIPTION

Figure 1:
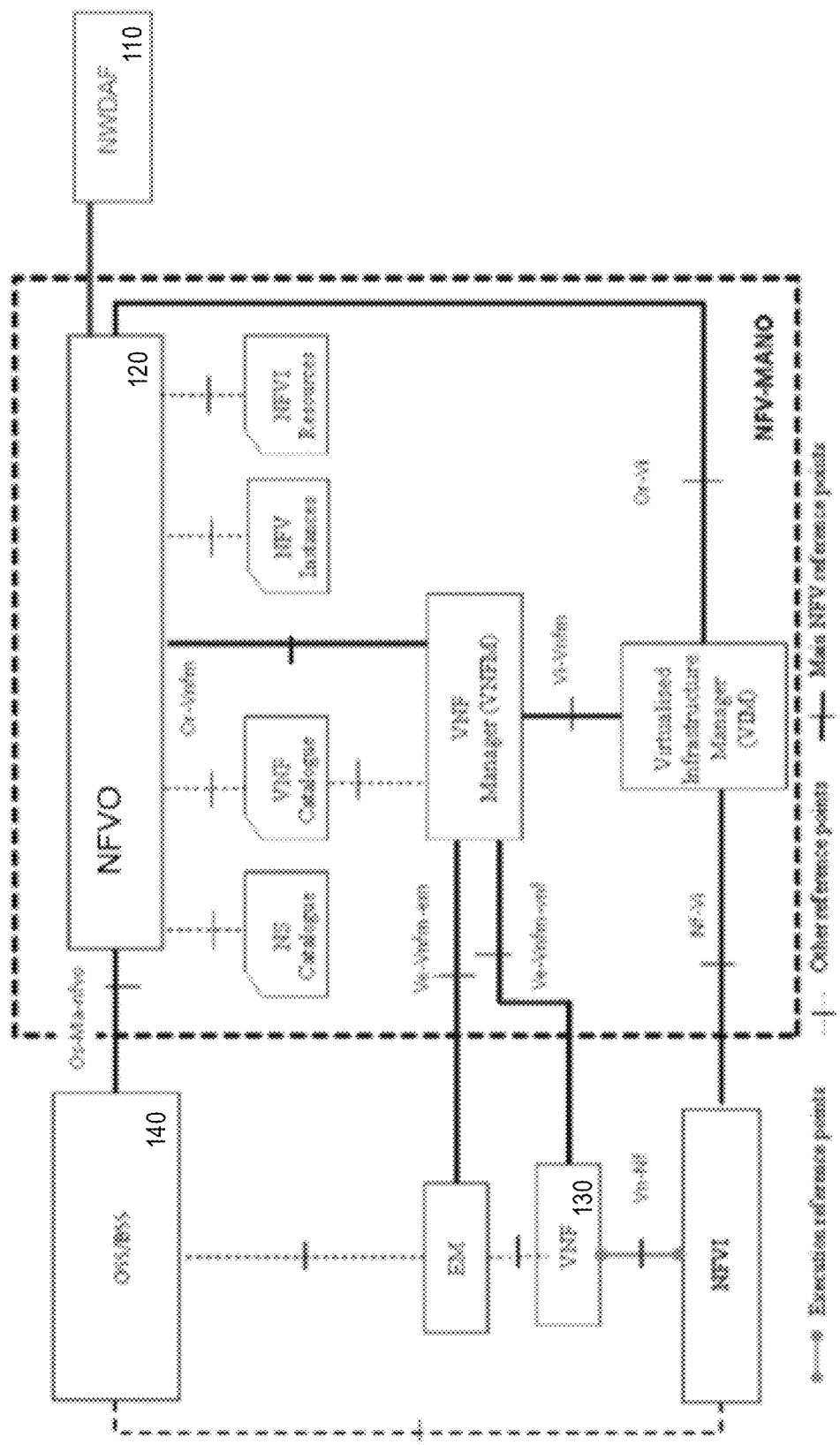
FIG. 1 is a block diagram illustrating an example of ETSI NFV Architecture with NFVO to NWDAF connectivity according to some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

In some examples, network slice scaling is more focused towards operator control/domain like 5G core elements including control plane ("CP") and user plane ("UP"), with limited consideration of Application Function, transport, fronthaul/backhaul, application service provider infrastructure ("SPR"), Gi interface & radio resources. Any request for VNF scaling can be considered as per the resources for the core nodes/Radio. However, determining whether to scale based on whether there are available resources may not reduce congestion or improve operation if the corresponding resources service are not available, not scalable, or out of the operator's control and unable to handle any increased capacity.

Various embodiments described herein describe determining a wholistic view of congestion and resources prior to scaling a network slice. In some embodiments, the network checks and considers resources not in an operator's domain/control (e.g., 3rd Party Application function and Internet exchange point). In additional or alternative embodiments, the network checks resources which are under an operator's domain (e.g., core node expansion, VNFs, transport).

In some embodiments, 5G will allow automated scaling and descaling based on the threshold in the VNFs. This means that VNFs can be expanded and contracted dynamically. Subscribers may access the Network to use some application (e.g. facebook or Netflix). If that application has limited capacity, expanding the VNF may not improve operation. In such case, scaling the VNF may not only waste the resources for the VNF, but may also unnecessarily load the orchestration with dynamic scaling requests.

In some examples, a subscriber may be accessing an operator app for music (e.g., Wynk or Airtel). Based on the resource requirement, VNF can detect congestion and request scaling to improve performance. Orchestration can check the resources and expands the VNF. However, the application server for Wynk may already be executing at 90% load and be unable to take further load. Thus, expanding VNF capacity may not result in a better user experience. Although this example is of a trusted Application Function, other examples exist for non-trusted AF and other resources/ nodes that are not in full control of operator, in which expanding or scaling a resource of a network slice may not improve user experience. A similar problem may occur during limitation at Access Side (RF\gNB\Transmission limitation), transport, fronthaul/backhaul, SPR, Gi Interface towards Data networks, etc. Increasing the VNF capacity in such case may not improve the overall subscriber experience and may waste multiple resources in the network.

Accordingly, in some examples, VNF\Network Slice scaling based on congestion can have cross-domain implication. In some embodiments, a better decision can be made regarding scaling by understanding a wholistic view of where and why congestion is occurring. Congestion may happen at various points in the network and due to different reasons. In some examples, congestion occurs at the UE—End user preferences (e.g., when streaming and screen size and modem capacity in it self are limiting). In additional or alternative examples, congestion occurs at RBS infrastructure and Radio resource (e.g., Operators NOC Radio personnel). In additional or alternative examples, congestion occurs at transport backhaul including transport aggregation points (e.g., transport operator domain). This is also one point of the problem where congestion may occur due to cost improvement/optimization in how the network is deployed. Increasing capacity in the transport can take time. Therefore, there may be no benefit in increasing CN capacity if the congestion occurs within a transport backhaul. In additional or alternative examples, congestion can occur in site infrastructure with Site LANs, in cloud infrastructure, in mobile applications as in a mobile core network, or in internet exchange points. Internet exchange points are an area where we increased congestion can be observed due to subscriber traffic being throttled down by the GW in line with the type of subscriptions.

In some examples, Congestion can also be caused by routing rules configurations between IPX points at the ISPs, which can cause application congestion that can down grade the user experience in a 5G system, for OTT applications.

In additional or alternative examples, congestion occurs due to Application design and relation between a UE and an APP server (an application can use an adaptive mechanism to adapt to the available capacity). In additional or alternative examples, congestion can occur due to the SPR infrastructure and media server capacity, which can be outside an operator's control. In some embodiments, an NEF can interact with the SPR application. The required capacity for the application can be monitored and fixed before the problem happens. However, in a case in which the SPR does not allocate needed resources, scaling of network slice capacity may not help and application congestion may occur. A SPR may have several sites with load balancing so one server may report that it is highly loaded, while for next application request from a UE going through the same GW in CN would get an application server with low load, hence the scaling of CN GW capacity in relation to application server capacity may be done based on more intelligent insights on data traffic to have any meaningful cost effective effects.

For operator owned service, there can be more control of how scaling of an application is done, but, for the complete end-to-end ("e2e") solution to work, automation may be implemented using AI/ML on the very top level of the e2e network. This top level "network/service orchestrator" function may collect data (e.g., UE type, Application-types, Application URI, IP addresses) from all interfaces (e.g., Application server, IP addresses, IPX, Slice orchestrator (including the NFVO), Cloud infrastructure for RAN and Core, Transport and site infrastructure switches, and GW-routers) and do intelligent analysis that produces policies that are downloaded in different parts of the network, including Core network NFVO, and mobility patterns of UEs and traffic patterns, and feedbacks on some Quality measures seen by the application.

In some embodiments, to make an intelligent decision about the scaling above, information may be analyzed. To describe this solution to check e2e capacity before expanding the core VNFs, use-case of slice expansion is considered as an example. In some examples, only limited information is used in this decision making to simplify the explanation.

In some embodiments, the available capacity at Access Network gNB\RAN\Transmission) may be considered when determining whether to scale a resource of a network slice. As per Network Architecture, an access node may or may not be part of a specific network Slice. But, an AMF may always the be connected to the access nodes. Therefore, the network may have visibility of the access node identities from the AMF. The network may also have visibility of the utilization of the access nodes from OSS\EM system. This information can be collected in real-time. Various embodiments herein describe collecting this information for long term usage in a NWDAF Network Function. However, in some embodiments, a database can be used as a logical entity to collect this information independent of any network node. When there is a request to expand the VNF/Network Slice, the Orchestrator can check with the NWDAF.

In some embodiments, the available capacity at Application Function (trusted/untrusted AF) can be considered when determining whether to scale a resource of a network slice. Subscribers can access the CSP Network to use some services. These services can be from Third Party OTT Players or from the CSP itself. These Application Functions may have limitation in terms of Bandwidth (Congestion) or serving capacity (Processing load). The network can also consider this information before granting any expansion of the VNF\Slice. In some embodiments, this information can also be collected in a NWDAF node to provide a long term perspective.

In some embodiments, the available capacity at different network/resource points outside the network/operator's control can be considered when determining whether to scale a resource of a network slice. Examples of points outside the network/operator's control can include an internet exchange point, SPR Infrastructure, or media server capacity. This information can be gathered by a NWDAF (or an intelligent database hosted in the network) and analyzed to calculate the viability of network slice expansion. In additional or alternative embodiments, a NWDAF may also predict the expansion\scaling request based on the previous such situations (e.g. if there is network expansion at peak hour 8 PM to 9 PM every weekend, then the NWDAF can pick-up this pattern from historical data and may take pro-active action near this peak-hour time. In additional or alternative embodiments, an NWDAF can also pro-actively inform AF & Access NFs about the scaling request so those nodes can also be scaled at the same time if required.

Various embodiments described herein for holistically analyzing can provide several advantages for the operator of a network. In some examples, CSP can use e2e view of the capacity requirement to provide a better service experience for the customer. In additional or alternative examples, network related decision (e.g. slice resource allocation) can be based on the e2e capacity constraints. In additional or alternative examples, resources and efforts may not be wasted on VNF expansion when there is already congestion in other points (e.g. AF & Access NFs). In additional or alternative examples, expected congestion nodes/resources can be pro-actively scaled.

The impact of 3PP/non-operator's domain resources/application like Application Function and Access Network Functions (i.e. included in 3GPP network slicing solution) may not be considered while expansion of network function (NF) to respective network slices. This may be controlled only on basis of static resource allocation. This may not ensure the best use of resources to maximize the profitability, especially in case of congestion time, which is quite frequent in telecom (specially around special days, events).

Various embodiments described herein, try to formulate a way so that Network Slice expansion can consider the impact on relevant Application Functions and Access Network Functions. In some embodiments, the non VNF functions can be considered during VNF\Network Slice scaling. In some examples, the NFVO may need to provide relevant information to the NWDAF, over a direct interface.

FIG. 1 depicts an example of an ETSI NFV Architecture 100 with NFVO 120 to NWDAF 110 Connectivity. Network Slicing can help in improving/optimizing the use of logical networks which are separated from each other and are created for specific business case or customer. Which in turn can provide specific services for the subscribers. Different subscribers are mapped to different Network slices based on the subscription. Different slices may provide different level of quality of experience based on the throughput, delay and services.

Some embodiments describe a pre-collection phase. The pre-collection phase can include populating the relevant information from different network functions (NFs) and Application Functions (AFs) towards NWDAF 110 to have a super set information available for implementing intelligence and automation (an aspect of Rel. 16, 3GPP) for scaling in/scaling out.

Some embodiments describe a post-collection phase. The post-collection phase can include using the information available/derived at NWDAF 110 for improved/optimized decision making (e.g. deciding on needed for Slice expansion or avoid it due to congestion at some points (which cannot be scaled furthered)).

The pre-collection phase can include populating the relevant information from different network functions (NFs) towards NWDAF 110. There can be various relevant information available in the network functions individually (Scattered) that can be shared with a central node for more informed and correlated decision. In some examples, information that can be collected and shared includes information from the OSS\EMS 140 providing resource utilization to the NWDAF 110 (e.g., radio resource utilization, transport utilization, and congestion). In additional or alternative examples, application functions associated with different slices can provide utilization and congestion information. In additional or alternative examples, the NFVO 120 can share the network resource information, including the number of resources currently used for a slice and the total resources available. In additional or alternative examples, the information related to mapping of various VNFs 130 to Network Slices is provisioned in NWDAF 110.

The NWDAF node 110 is an analytics node introduced in 5G which can support automation and analytics needed for 5G architect to be agile and dynamic in terms of scale out/scale in based on dynamic network conditions. An NWDAF 110 may be the same as defined in 3GPP with extensions, or a network data analytics function on a higher level above core network functions, to build insights for an e2e network path including output of policies to be used for scaling of network slice resources.

A VNF 130 may provide the expansion (scale out) request to EMS\VNF Manager, which is inbuild current logic based on different parameters like more than "x" no of users, CPU/Storage threshold@ OSS nodes 140 but there might be congestion situation in other elements as well (e.g. Congestion in transport network, in physical or virtual switches, radio conditions)

These factors can be considered by NWDAF 110 with appropriate information from the OSS 140. Different elements of the network viz transport and RAN provide the KPI information to centralized OSS 140 which can relay it to NWDAF 110 for analysis & decision making.

Therefore, whenever the VNF\Network Slice 130 is expecting or reaches the congestion\overload situation, which is very practical situation, the End to End information can also be used for decision making. This information will also be stored NWDAF node 110 so that Application function specific information covered in 5.1.1. and NF information can be correlated at one network function (NWDAF) 110 to have end to end view needed for expansion decision.

Figure 2:
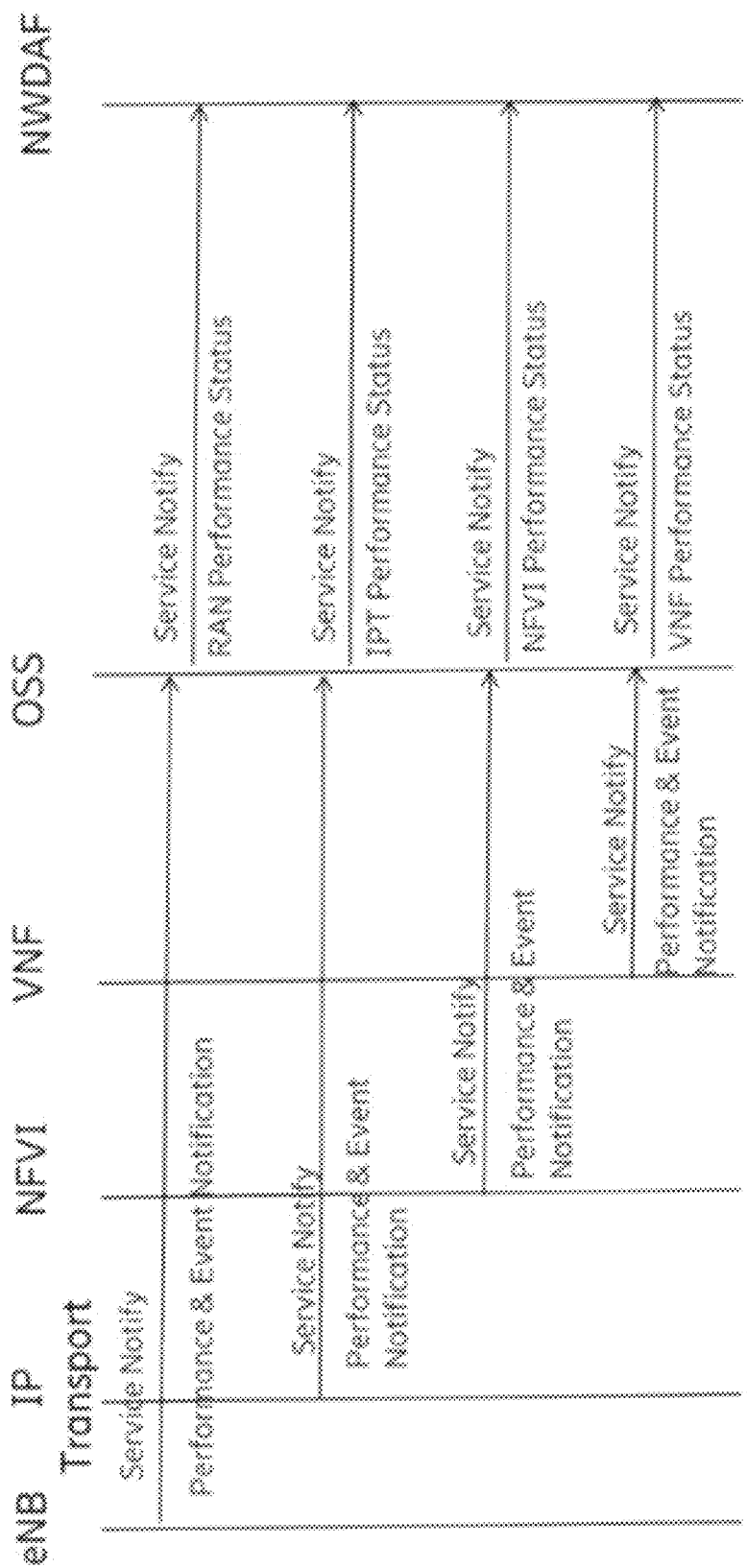
FIG. 2 is a signal flow diagram illustrating an example of OSS giving inputs to NWDAF according to some embodiments of the present disclosure.

FIG. 2 is an OSS giving inputs to NWDAF. Different network elements can provide the performance related data to the OSS. The OSS can update the NWDAF with relevant performance information so that the NWDAF can decide which network elements may be added to the congestion.

When VNF\Network Slice triggers slice expansion, there might be congestion\overload at Application Function (AF) level as well due to high traffic load. This information from AF is required to make better decisions (e.g. an AF hosted in an application server AS at the operator's domain, where the information is sent from the infrastructure orchestration/monitoring function of the AF). Let us say, if AS is 90% overloaded (example), it should be a better idea to not connect new users. Further adding new user can lead to detrimental experience for existing customer.

When Application Server for the AF is overloaded, it reports this status in real-time to NWDAF via NEF. NEF reports this to NWDAF which stores this in repository to be used in future transactions. E.g. overload status of an Application Server with e.g. 90% CPU load is stored. The status report may be a collated load profile of several properties (CPU, Memory, Network), collected over time reaching a threshold value that triggers the report.

The NEF can be an optional node incase the AFx is a trusted node in the operator's environment. As per ETSI MEC standards, Application Server for third party can be co-hosted by operator on his environment or the Application server can be hosted in their (3rd party Data center)

Figure 3:
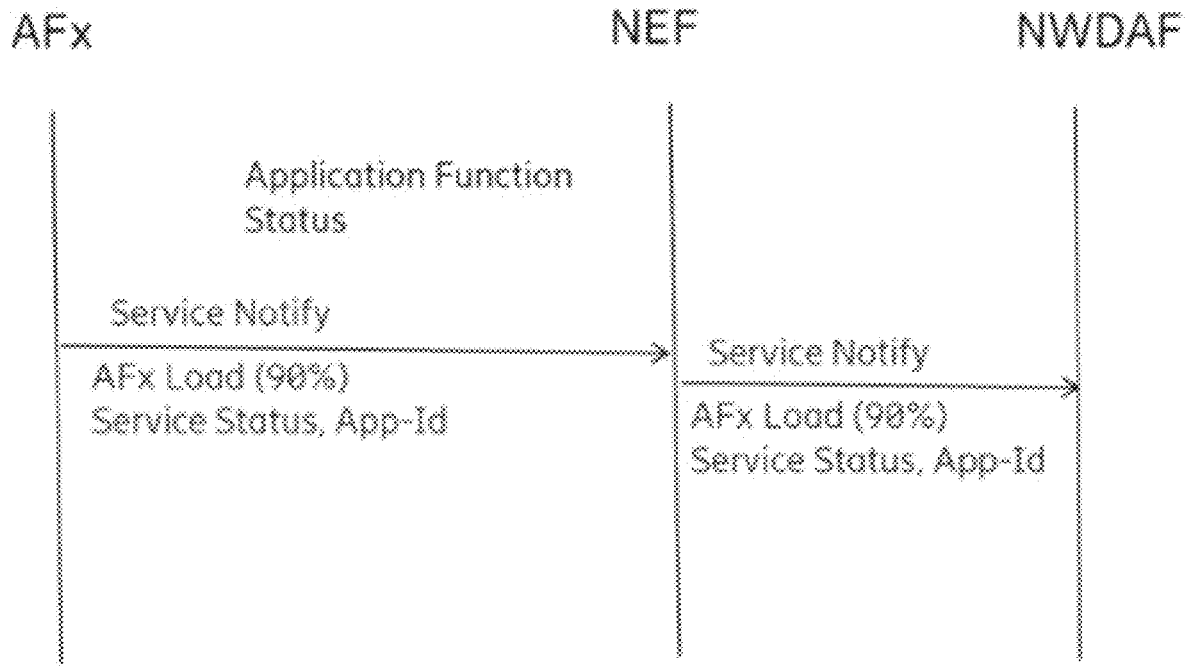
FIG. 3 is a signal flow diagram illustrating an example of populating the AFx and service status to the NWDAF according to some embodiments of the present disclosure.
Figure 4:
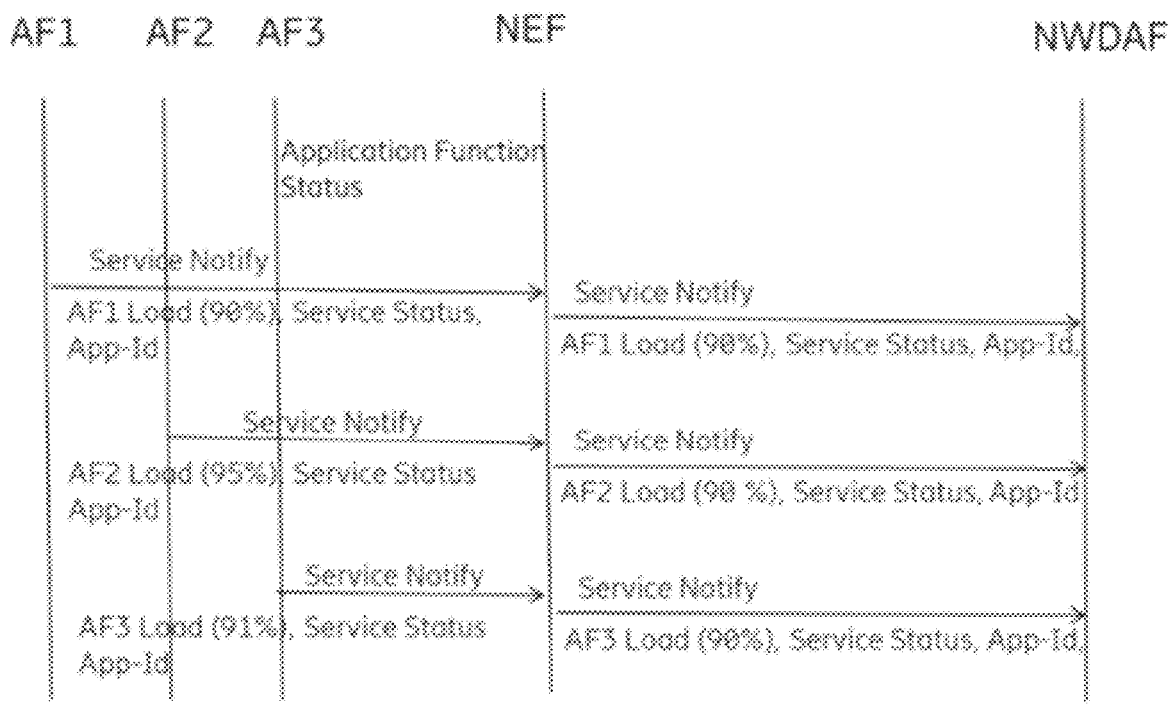
FIG. 4 is a signal flow diagram illustrating an example of populating the AFx and service status from different AFx to the NWDAF according to some embodiments of the present disclosure.

FIG. 3 depicts a sequence diagram to populate the AFx & Service status to NWDAF. FIG. 4 depicts a sequence diagram to populate the AFx & Service status (from different AFx) to NWDAF. This data can be saved in NWDAF as historical data set. NWDAF then uses these details for deciding on VNF\Network Slice Expansion. This data is also used for predicting overload situation in the future by analyzing the past trends. The table of FIG. 23 provides application function load information referenced in FIG. 4

In some embodiments, the same AF will be used for all Network Slices and no differentiation on Network Slice is required for such Application functions. In additional or alternative embodiments, different Application Functions (especially trusted) can be planned to be used as per Network Slice then this information need to be included in decision.

In some embodiments the NWDAF can determine which AF is part of which Network Slice, in case network slices share the same AF instance, by the application function identifying itself towards the NEF with Application ID. This application ID uniquely identifies the AF. The NEF thus needs to be provisioned with a mapping between different Application ID and Network Slice. The NEF can then provide this Information to the NWDAF. In additional or alternative embodiments, the NWDAF predicts a virtual topology of best fit of AF location to the network slice.

Overlapping AF IDs or AF IP addresses can be understood as that same type of AF instance in different Network Slices, has same ID and/or IP address.

Figure 5:
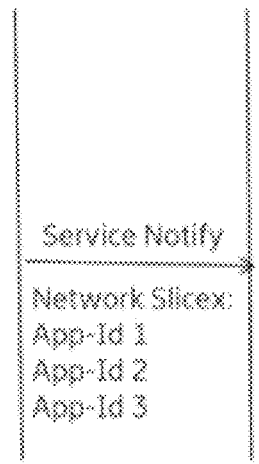
FIG. 5 is a signal flow diagram illustrating an example of provisioning network slice services in NEF according to some embodiments of the present disclosure.
Figure 6:
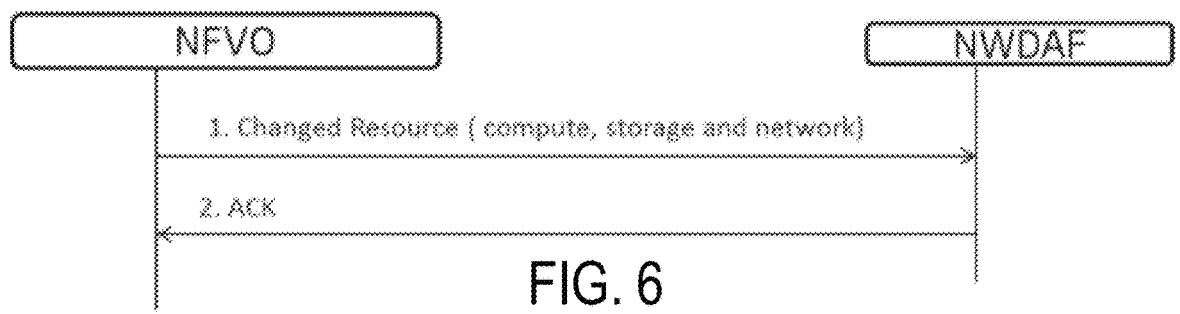
FIG. 6 is a signal flow diagram illustrating an example of NFVO sharing resource availability information with the NWDAF according to some embodiments of the present disclosure.

The NWDAF can store this information along with the application function load and service status information. It can use this information to decide on the VNF\Network Slice expansion. FIG. 5 depicts provisioning network slice services in NEF In some embodiments, the NFVO keeps the information of available resource pool and the same is shared with NWDAF at any change. FIG. 6 depicts the NFVO sharing resource availability information. The NFVO provides all the scaling data (expansion and contraction). NWDAF maintains a historical record for all these transactions. Based on the network requirements, Slice (VNFs) can be expanded or reduced dynamically. Each such request is processed by NFVO & is forwarded to NWDAF. The table of FIG. 24 provides an example of changes of resources with time referenced in FIG. 6. Such information can be shared at change of resources. This message can also be clubbed with previous messages described above.

In some embodiments, as scaling is done at VNF level. VNF instance configurations for a network slice can be provisioned in NWDAF, which VNFs are part of which Network Slice. This Provisioning entity can be Network Slice Manager (NSM) which is external to NFV Architectural Framework.

Figure 7:
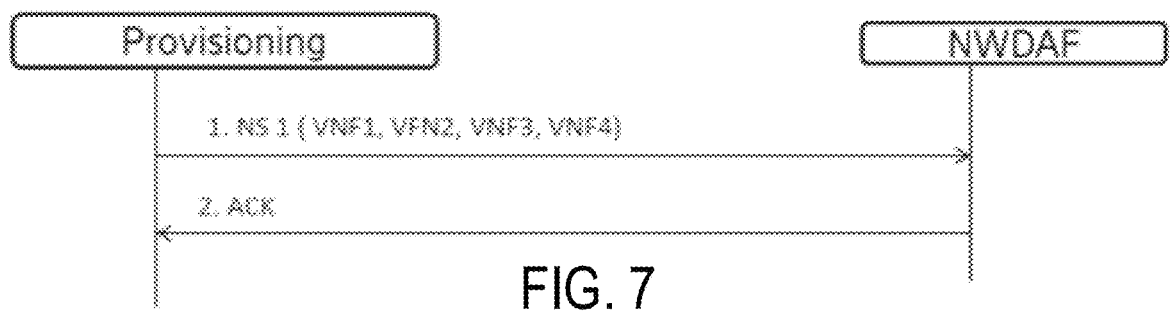
FIG. 7 is a signal flow diagram illustrating an example of provisioning network slice to VNF mapping according to some embodiments of the present disclosure.

FIG. 7 depicts provisioning a network slice to VNF mapping. The provisioning system can provide mapping details between Network Slice and different VNFs. The NFWDAF can acknowledge the received data.

In the post-collection phase, all collected data is analyzed and used to make policy decisions. These decisions can be relevant for expansion of the network slice. As highlighted earlier, the NWDAF node can be populated with relevant information including, but not limited to Application Function load status, Access Network Load status, Internet Exchange Points/SPR Infra/Media service capacity and information related to scaling requests.

In some embodiments the allocation of resources to Network Slice can be based on the end to end service improvement for the subscriber. Each Network Slice has accompanying resource requirement on Radio resources, Application Function resources and transport network. These factors are considered while allocating resources to different network Slices.

In additional or alternative embodiments, a scaling requirement is generated by VNFM or NFVO as more resources are required to handle the subscriber traffic. Information related to this request is shared by NFVO to the NWDAF.

In additional or alternative embodiments, the NWDAF based on scaling request, AF Load status, NF load status, and historical data, decides which Network Slice will scale and which should not be scaled.

In additional or alternative embodiments, the NWDAF may decide that congestion on some resources e.g. SGi (N6) interface may not be improved and is a bottleneck for the user session. So, it may decide not to scale the VNF as it will not improve the situation, given that other bottlenecks exist in the E2E Flow.

In additional or alternative embodiments, even if it does not take any scaling action, it can record these events and decisions for later analysis in non-realtime time.

In additional or alternative embodiments, the NWDAF keeps historical data of all the congestion situations and relevant events from complete network. This data is used for analysis to identify the patterns. E.g. congestion is started in particular node at a particular day/time which might be correlated to any event. E.g. a cricket match telecast or special TV programs. This data is then shared with Operations/Services Mgmt. to have more improved/optimized planning. The NWDAF based on historical or real-time data can push the policies towards different nodes. So, that these nodes can process the data in efficient manner based on the predicted traffic bursts and congestion.

In some embodiments, the NFVO will get the scaling request from VNFM, EM or other management entity. Currently, a NFVO can make the decision based on the configured policies and available resources. Some embodiments, propose further checking with NWDAF for these requests. A NWDAF may consider the End to End factors as per the inputs collected in pre-collection phase. Then it will provide the decision to NFVO.

After scaling operation is completed as per normal flow, NFVO will update the NWDAF about the available resources.

In some embodiments, as per ETSI MANO Architecture, Scaling request can be generated in following three cases. First, auto-scaling, in which the VNF Manager monitors the state of a VNF instance and triggers the scaling operation when certain conditions are met. For monitoring a VNF instance's state, it can for instance track infrastructure-level and/or VNF-level events. Infrastructure-level events are generated by the VIM. VNF-Level events may be generated by the VNF instance or its EM. Second, on-demand scaling, in which a VNF instance or its EM monitor the state of a VNF instance and trigger a scaling operation through explicit request to the VNF Manager. Third, scaling based on management request, where the scaling request is triggered by some sender (OSS/BSS or operator) towards VNFM via the NFVO. A request can be sent to NFVO for VNF scaling. In some embodiments, an interface can exist between the NFVO and the NWDAF. The NFVO on this interface provides all the scaling related information to NWDAF.

Figure 8:
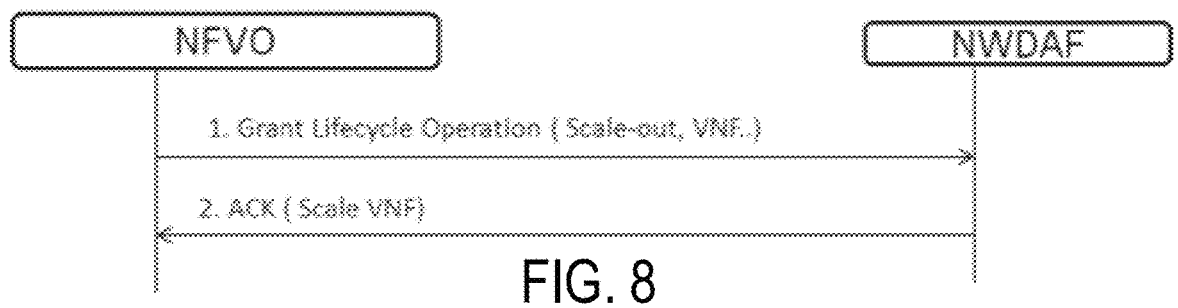
FIG. 8 is a signal flow diagram illustrating an example of collecting scaling related data according to some embodiments of the present disclosure.

FIG. 8 depicts collection of scaling related data. The NFVO provides VNF scale-out request details to NWDAF. The NFWDAF analyzes the inputs and provide the response with permit or deny recommendations. In some embodiments, scaling with is performed with resource allocation done by VNF Manager. In additional or alternative embodiments, scaling with resource allocation can be done by NFVO. In both cases, the NFVO can control the scaling process by granting of resources for congestion use case.

Figure 9:
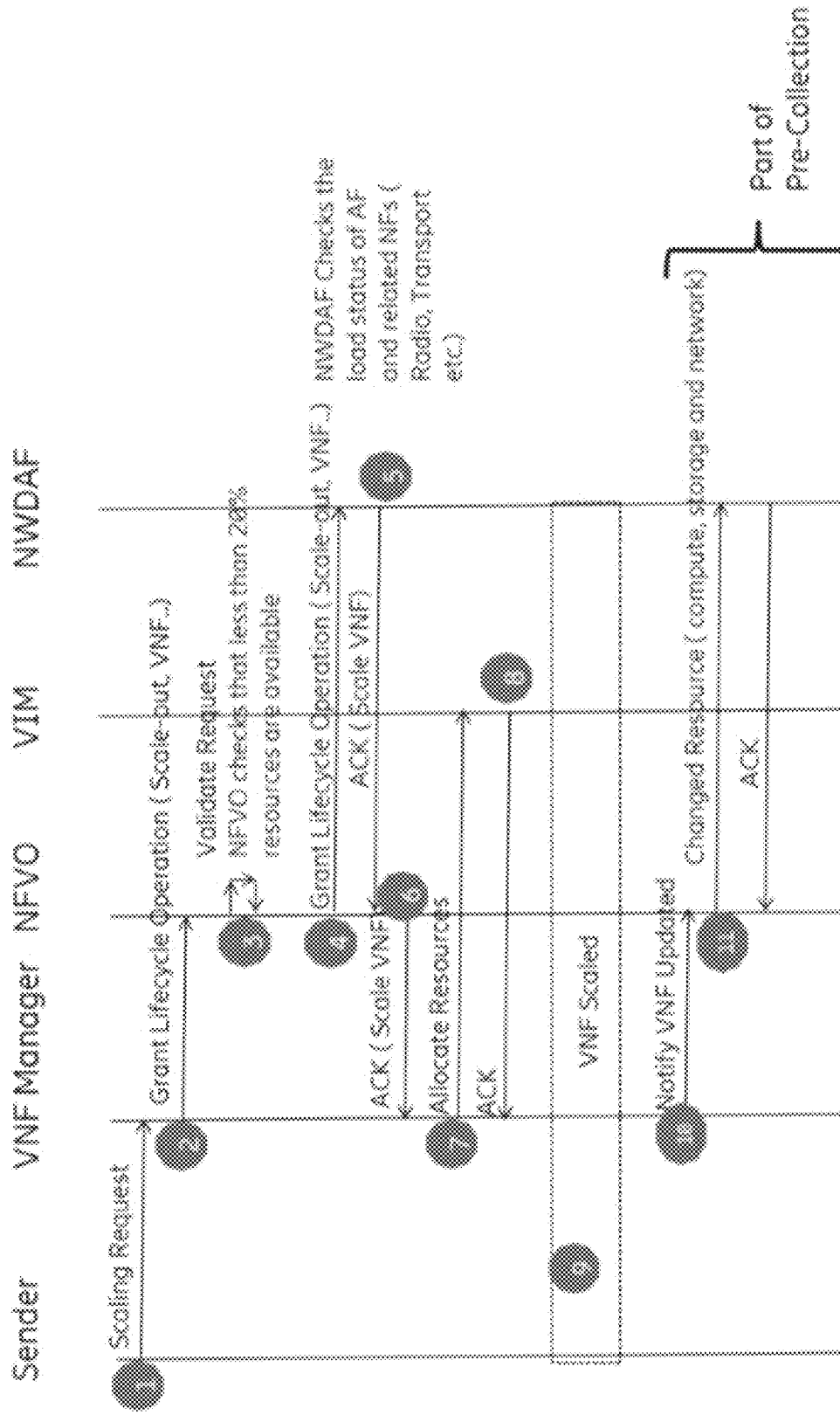
FIG. 9 is a signal flow diagram illustrating an example of scaling with resource allocation done by the VNF manager according to some embodiments of the present disclosure.

FIG. 9 depicts a flow with resource allocation by the VNF Manger. In some embodiments, the sender can be the VNF (Auto-Scaling) or OSS/BSS component. The operations for the VNF instance scaling can include: 1. Sender initiates the scaling request; 2. The VNF Manager requests granting to the NFVO for the VNF expansion based on the specifications listed in the VNFD (CPU, Memory, IP, etc.) using the operation Grant Lifecycle Operation of the VNF Lifecycle Operation Granting interface; 3. The NFVO takes scaling decision and checks resource request (CPU, Memory, IP, etc.) against its capacity database for free resource availability. The NFVO validates the request for policy conformance. It also checks the resource available for this scaling. It realizes that available resources are less than 20% so it should enforce the slice prioritization. To get the decision based on slice priority, it sends the request to NWDAF; 4. NFVO sends the VNF & scaling request related information to NWDAF. NWDAF checks the Load status of AFs & other related NFs including 3PP/domain which are not part of operators domain and decides that this Slice can be scaled; 5. NWDAF decision is provided to NFVO that whether access is granted or not (he NFVO may otherwise optionally do resource reservation for the requested resources by using the Create Resource Reservation operation over the Virtualized Resources management interface); 6. The NFVO grants the scale-out operation of the VNF to the VNF Manager and sends back sufficient information to further execute the scaling operation; 7. The VNF Manager sends the request to create and start the VMs as appropriate and as instructed by the NFVO, sending VIM Identifier and VMs parameters using the operations Allocate Resource or Update Resource or Scale Resource of the Virtualized Resources Management interface; 8. The VIM creates and starts the VMs and the relevant networking resources, then acknowledges successful operation to the VNF Manager; 9. VNF does necessary operations for VNF creation and configuration; 10. VNF Manager reports successful VNF expansion to the NFVO using the VNF Lifecycle Change Notification interface. The NFVO now is aware that the new VNF configuration is instantiated in the infrastructure (the NFVO maps the VNF to the proper VIM and resource pool); 11. The NFVO updates the NWDAF with updated resource availability for making future decisions related to the Slice Priority.

Figure 10:
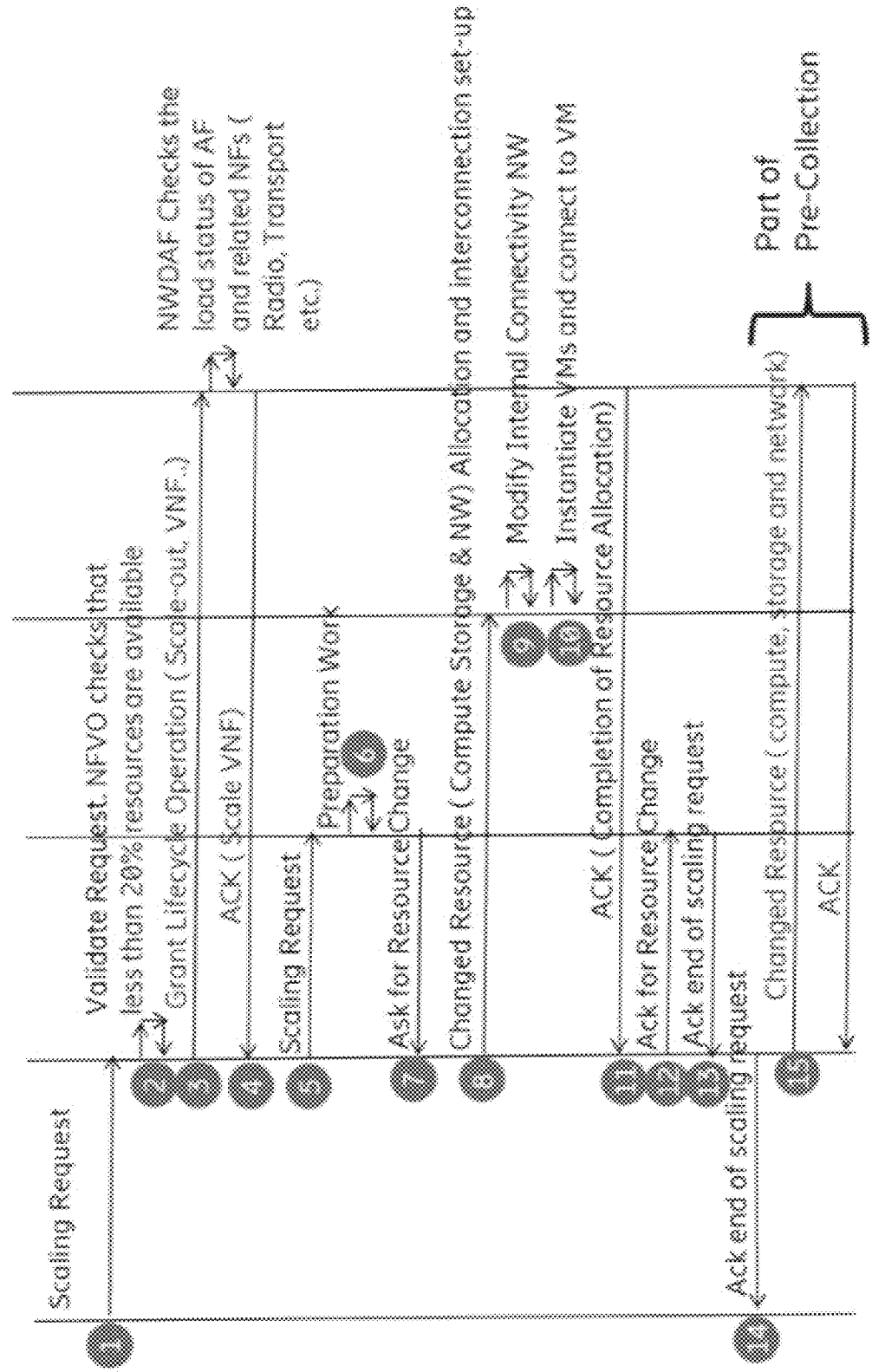
FIG. 10 is a signal flow diagram illustrating an example of scaling with resource allocation done by the NFVO according to some embodiments of the present disclosure.

FIG. 10 depicts a flow with resource allocation by the NFVO. In some embodiments, the sender can be the VNF manager, or OSS/BSS, or else be manually triggered by an operator. The operations for the VNF instance can include: 1. The NFVO receives the scaling request from the sender, e.g. OSS using the operation Scale VNF of the VNF Lifecycle Management interface; 2. The NFVO validates the request for policy conformance. It also checks the resource available for this scaling. It realizes that available resources are less than 20% so it should enforce the slice prioritization. To get the decision based on slice priority, it sends the request to NWDAF; 3. NFVO sends the VNF & scaling request related information to NWDAF. NWDAF checks the Load status of AFs & other related NFs and 3PP/non operator domain resources and decides that this Slice can be scaled or not.; 4. NWDAF decision is provided to NFVO; 5. NFVO finds the VNF Manager relevant for this VNF type. Optionally, NFVO runs a feasibility check of the VNF scaling request to reserve resources before doing the actual scaling (The NFVO sends the scaling request to the VNF Manager, with the scaling data and, if resource reservation has been done, the reservation information using the operation Scale VNF of the VNF Lifecycle Management interface); 6. The VNF Manager executes any needed preparation work (request validation, parameter validation. This might include modifying/complementing the input scaling data with VNF lifecycle specific constraints. If resource reservation was done by NFVO then the VNFM will skip this step); 7. The VNF Manager calls the NFVO for resource change using the operation Allocate Resource or Update Resource or Scale Resource of the Virtualized Resources Management interface; 8. NFVO requests from VIM allocation of changed resources (compute, storage and network) needed for the scaling request using the operations Allocate Resource or Update Resource or Scale Resource of the Virtualized Resources Management interface; 9. VIM modifies as needed the internal connectivity network; 10. VIM creates and starts the needed new compute (VMs) and storage resources and attaches new instantiated VMs to internal connectivity network; 11. Acknowledgement of completion of resource change back to NFVO; 12. NFVO acknowledges the completion of the resource change back to VNF Manager; 13. The VNF Manager configures the scaled VNF as necessary using the add/create/set config object operations of the VNF configuration interface. VNF Manager acknowledges the end of the scaling request back to the NFVO; 14. The NFVO acknowledges the end of the scaling request back to the requester; 15. The NFVO updates the NWDAF with updated resource availability for making future decisions related to the Slice Priority. In case the VNF Manager is issuing the scaling request, some of the steps of this procedure can be further improved/optimized.

In some embodiments, if AF load is high then there is no benefit in scaling the VNF\Network Slice. To further enhance the scaling procedure, NWDAF can also inform the Application function about the scaling request and thus Application function can be scaled ahead of VNF Scaling assuming Operator and 3PP Application function have an alignment for the same.

In some examples, for a NASCAR games in US, operators and respective 3PP can align for enhanced collaboration for superior customer experience. In some countries (e.g., India), operators like Airtel and Netflix are collaborating on offerings together. This kind of collaboration may further increase between Enterprise and CSP in future enabled via SBA (NEF) for new and innovative use cases like providing Network Slice as a service for Enterprise (e.g. Netflix).

In some embodiments, congestion in the network cannot be improved by scaling the VNF as bottlenecks exist in other parts (outside the NW Slice) of the network. For simplicity we have considered the flow diagram with VNF Manager initiated request.

Figure 11:
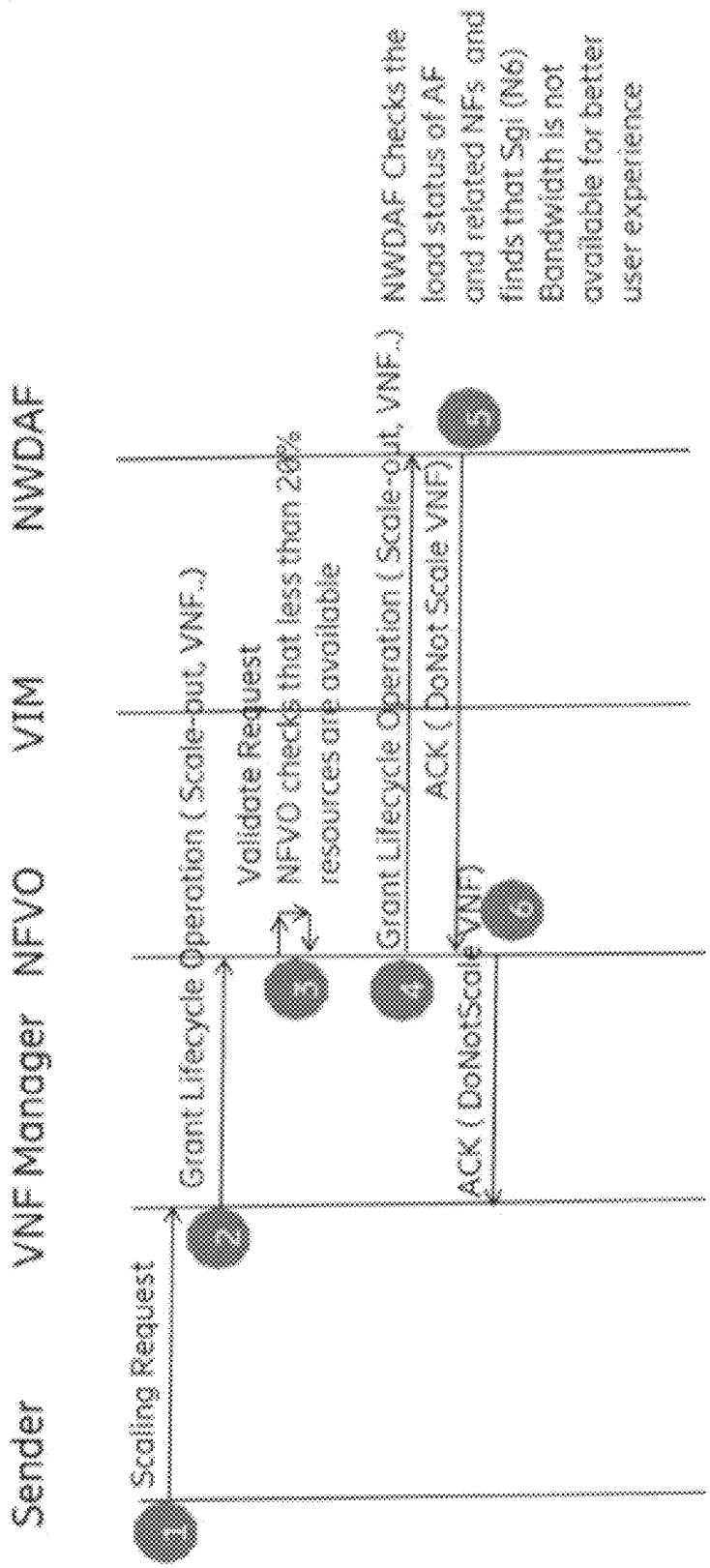
FIG. 11 is a signal flow diagram illustrating an example of resource allocation by the VNF manager with access not granted according to some embodiments of the present disclosure.

FIG. 11 depicts a flow with resource allocation by VNF Manger with access not granted. In some embodiments, the sender can be the VNF (Auto-Scaling) or OSS/BSS component and the VNF Manager can be the one issuing the scaling request. The operations for the VNF instance scaling can include: 1. Sender initiates the scaling request; 2. The VNF Manager requests granting to the NFVO for the VNF expansion based on the specifications listed in the VNFD (CPU, Memory, IP, etc.) using the operation Grant Lifecycle Operation of the VNF Lifecycle Operation Granting interface; 3. The NFVO takes scaling decision and checks resource request (CPU, Memory, IP, etc.) against its capacity database for free resource availability. The NFVO validates the request for policy conformance. It also checks the resource available for this scaling. It realizes that available resources are less than 20% so it should enforce the slice prioritization. To get the decision based on slice priority, it sends the request to NWDAF; 4. NFVO sends the VNF & scaling request related information to NWDAF. NWDAF checks the Load status of AFs & other related NFs. It determines that, there is congestion on the Network Elements on Sgi (N6) interface. This congestion cannot be improved for now and thus scaling the VNF will not improve the subscriber experience; 5. NWDAF decision is provided to NFVO that access is not granted; 6. Scaling of the VNF is not performed in this case as long as situation on the bottleneck is not improved; 7. This event of scaling request and unimprovable bottleneck is recorded.

Figure 12:
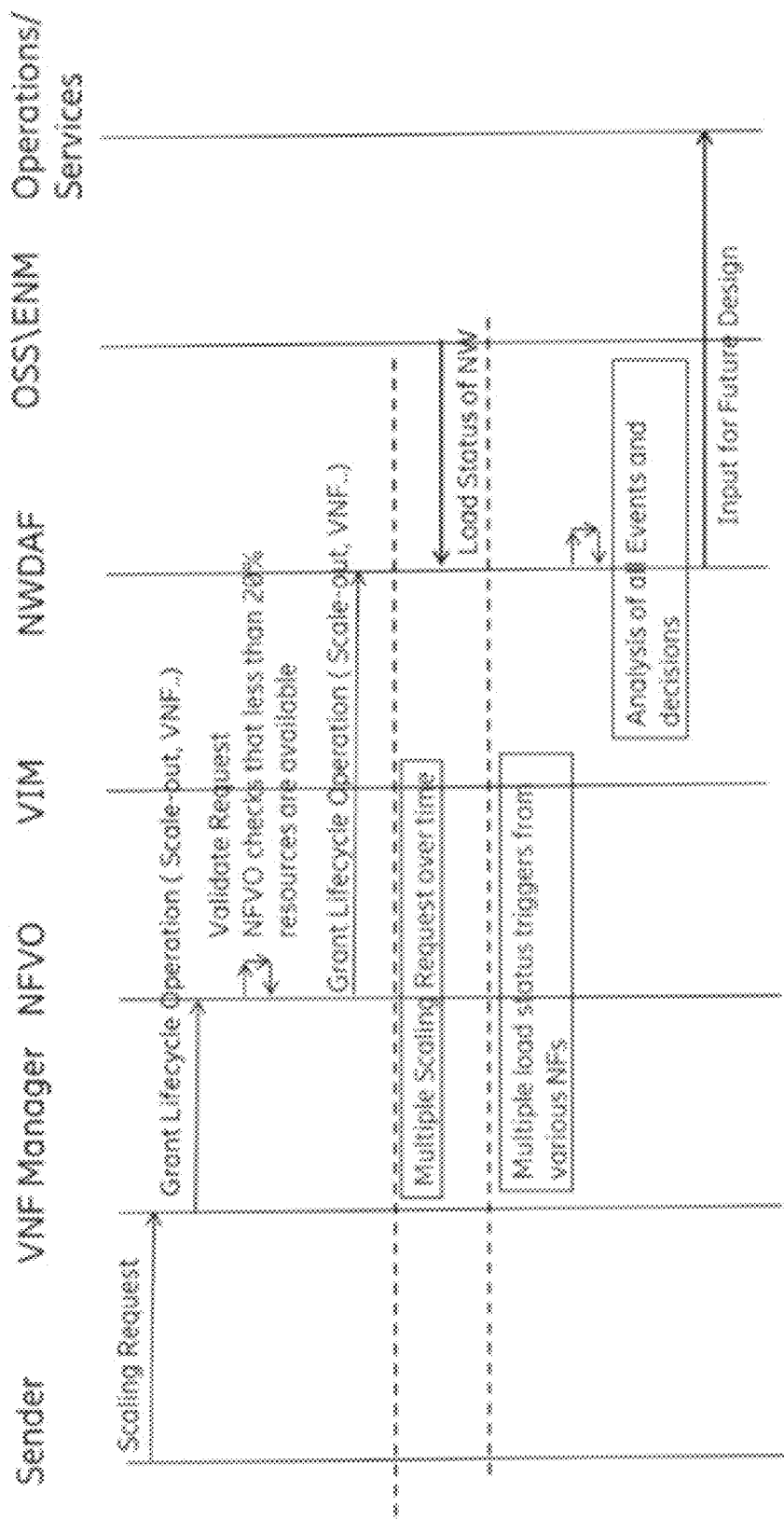
FIG. 12 is a signal flow diagram illustrating an example of resource allocation by the VNF manager for historical data collection according to some embodiments of the present disclosure.

In some embodiments, all events are recorded and analyzed to find the patterns which can be used for future planning. FIG. 12 depicts a flow with resource allocation by VNF Manger for historical data collection. The sender can be the VNF (Auto-Scaling) or OSS/BSS component. In case the VNF Manager is the one issuing the scaling request. The steps for the VNF instance scaling can include: 1. Sender initiates the scaling request; 2. The VNF Manager requests granting to the NFVO for the VNF expansion based on the specifications listed in the VNFD (CPU, Memory, IP, etc.) using the operation Grant Lifecycle Operation of the VNF Lifecycle Operation Granting interface; 3. The NFVO takes scaling decision and checks resource request (CPU, Memory, IP, etc.) against its capacity database for free resource availability. The NFVO validates the request for policy conformance. It also checks the resource available for this scaling. It realizes that available resources are less than 20% so it should enforce the slice prioritization. To get the decision based on slice priority, it sends the request to NWDAF; 4. NFVO sends the VNF & scaling request related information to NWDAF; 5. NWDAF records multiple such requests over a period of time and keeps track of decision taken; 6. NWDAF also records the different congestion situations in the network, and whether those were improvable or not; 7. All this data is used to analyze and find patterns. These results are used to prepare inputs for future planning. The table of FIG. 24 provides an example of historical data for planning as referenced in FIG. 12.

Figure 13:
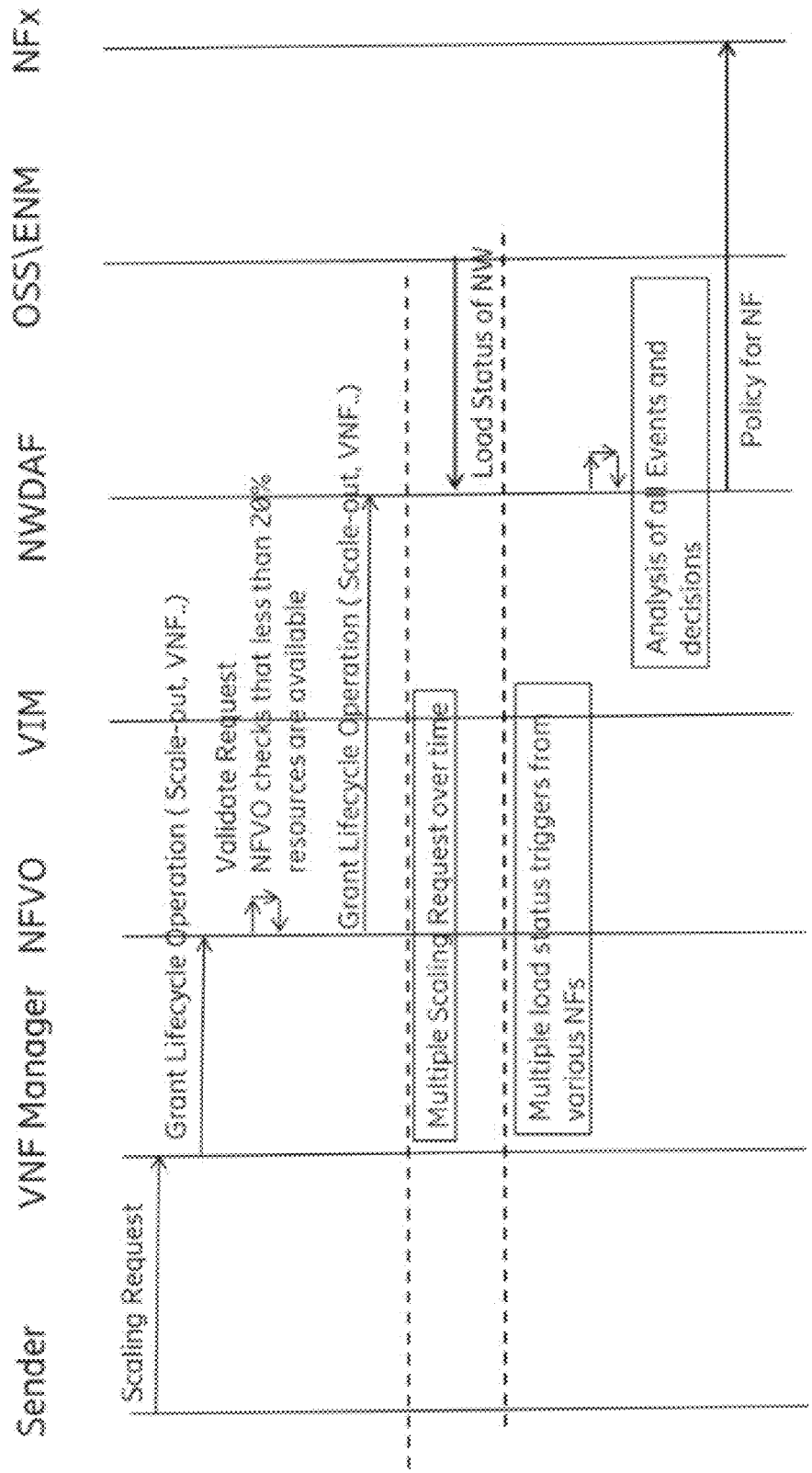
FIG. 13 is a signal flow diagram illustrating an example of resource allocation by the VNF manager for policy application for NFs according to some embodiments of the present disclosure.

The NWDAF based on historical or real-time data can push the policies towards different nodes. So, that these nodes can process the data in efficient manner based on the predicted traffic bursts and congestion. In some embodiments, all events are recorded and analyzed to find the patterns which can be used for future planning. FIG. 13 depicts a flow with resource allocation by VNF Manger for policy application for NFs. In some embodiments, the sender can be the VNF (Auto-Scaling) or OSS/BSS component and the VNF Manager can be the one issuing the scaling request. The operations for the VNF instance scaling can include: 1. Sender initiates the scaling request; 2. The VNF Manager requests granting to the NFVO for the VNF expansion based on the specifications listed in the VNFD (CPU, Memory, IP, etc.) using the operation Grant Lifecycle Operation of the VNF Lifecycle Operation Granting interface; 3. The NFVO takes scaling decision and checks resource request (CPU, Memory, IP, etc.) against its capacity database for free resource availability. The NFVO validates the request for policy conformance. It also checks the resource available for this scaling. It realizes that available resources are less than 20% so it should enforce the slice prioritization. To get the decision based on slice priority, it sends the request to NWDAF; 4. NFVO sends the VNF & scaling request related information to NWDAF; 5. NWDAF records multiple such requests over a period of time and keeps track of decision taken; 6. NWDAF also records the different congestion situations in the network, and whether those were improvable or not.; 7. All this data is used to analyze and find patterns. These results are used to prepare different policies for Network Functions. Example on policy is the PCF to set priority for a data flow during specific time of day. For example in the case that an application has higher priority for a subscription, but the AS system is overloaded for that application data flow, it does not help to have a higher priority in the radio access network. This access capacity could be better utilized if this application data flow did not have higher priority as it anyway is perceiving poor performance due to AS congestion.

Network Slicing is new functionality considered for 5G networks. The embodiments described herein consider End to End view (Application Function and Access NFs (Radio functions), Infrastructure resources (VNFI), application SPR) before executing a VNF\Slice Expansion request.

Figure 14:
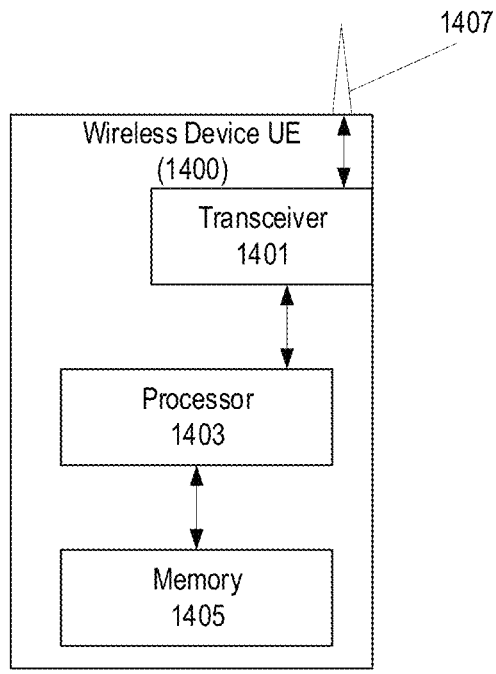
FIG. 14 is a block diagram illustrating an example of a wireless device ("UE") according to some embodiments of the present disclosure.

FIG. 14 is a block diagram illustrating elements of a wireless device UE 1400 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. (Wireless device 1400 may be provided, for example, as discussed below with respect to wireless device QQ110 of FIG. 26.) As shown, wireless device UE may include an antenna 1407 (e.g., corresponding to antenna QQ111 of FIG. 26), and transceiver circuitry 601 (also referred to as a transceiver, e.g., corresponding to interface QQ114 of FIG. 26) including a transmitter and a receiver configured to provide uplink and downlink radio communications with a base station(s) (e.g., corresponding to network node QQ160 of FIG. 26) of a radio access network. Wireless device UE may also include processing circuitry 1403 (also referred to as a processor, e.g., corresponding to processing circuitry QQ120 of FIG. 26) coupled to the transceiver circuitry, and memory circuitry 1405 (also referred to as memory, e.g., corresponding to device readable medium QQ130 of FIG. 26) coupled to the processing circuitry. The memory circuitry 1405 may include computer readable program code that when executed by the processing circuitry 1403 causes the processing circuitry to perform operations according to embodiments disclosed herein. According to other embodiments, processing circuitry 1403 may be defined to include memory so that separate memory circuitry is not required. Wireless device UE may also include an interface (such as a user interface) coupled with processing circuitry 1403, and/or wireless device UE may be incorporated in a vehicle.

As discussed herein, operations of wireless device UE may be performed by processing circuitry 1403 and/or transceiver circuitry 1401. For example, processing circuitry 1403 may control transceiver circuitry 1401 to transmit communications through transceiver circuitry 1401 over a radio interface to a radio access network node (also referred to as a base station) and/or to receive communications through transceiver circuitry 1401 from a RAN node over a radio interface. Moreover, modules may be stored in memory circuitry 1405, and these modules may provide instructions so that when instructions of a module are executed by processing circuitry 1403, processing circuitry 1403 performs respective operations.

Figure 15:
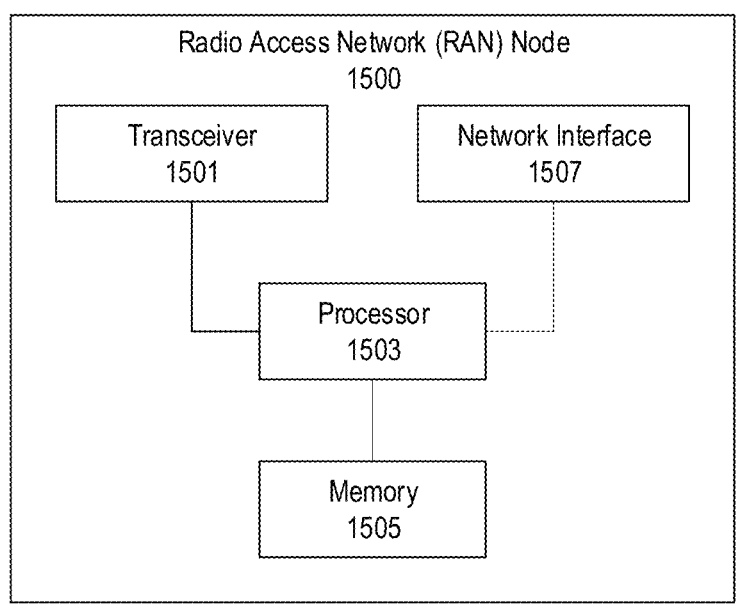
FIG. 15 is a block diagram illustrating an example of a radio access network ("RAN") node (e.g., a base station eNB/gNB) according to some embodiments of the present disclosure.

FIG. 15 is a block diagram illustrating elements of a radio access network RAN node 1500 (also referred to as a network node, base station, eNodeB/eNB, gNodeB/gNB, etc.) of a Radio Access Network (RAN) configured to provide cellular communication according to embodiments of inventive concepts. (RAN node 1500 may be provided, for example, as discussed below with respect to network node QQ160 of FIG. 26.) As shown, the RAN node may include transceiver circuitry 1501 (also referred to as a transceiver, e.g., corresponding to portions of interface QQ190 of FIG. 26) including a transmitter and a receiver configured to provide uplink and downlink radio communications with mobile terminals. The RAN node may include network interface circuitry 1507 (also referred to as a network interface, e.g., corresponding to portions of interface QQ190 of FIG. 26) configured to provide communications with other nodes (e.g., with other base stations) of the RAN and/or core network CN. The network node may also include a processing circuitry 1503 (also referred to as a processor, e.g., corresponding to processing circuitry QQ170) coupled to the transceiver circuitry, and a memory circuitry 1505 (also referred to as memory, e.g., corresponding to device readable medium QQ180 of FIG. 26) coupled to the processing circuitry. The memory circuitry 1505 may include computer readable program code that when executed by the processing circuitry 1503 causes the processing circuitry to perform operations according to embodiments disclosed herein. According to other embodiments, processing circuitry 1503 may be defined to include memory so that a separate memory circuitry is not required.

As discussed herein, operations of the RAN node may be performed by processing circuitry 1503, network interface 1507, and/or transceiver 1501. For example, processing circuitry 1503 may control transceiver 1501 to transmit downlink communications through transceiver 1501 over a radio interface to one or more mobile terminals UEs and/or to receive uplink communications through transceiver 1501 from one or more mobile terminals UEs over a radio interface. Similarly, processing circuitry 1503 may control network interface 1507 to transmit communications through network interface 707 to one or more other network nodes and/or to receive communications through network interface from one or more other network nodes. Moreover, modules may be stored in memory 1505, and these modules may provide instructions so that when instructions of a module are executed by processing circuitry 1503, processing circuitry 1503 performs respective operations.

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 16:
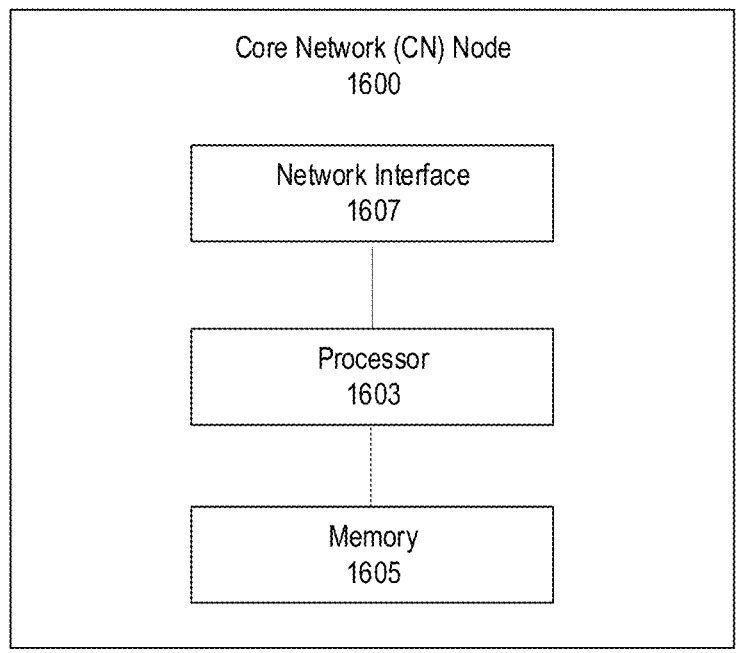
FIG. 16 is a block diagram illustrating an example of a core network ("CN") node (e.g., an AMF node, an SMF node, an OAM node, etc.) according to some embodiments of the present disclosure.

FIG. 16 is a block diagram illustrating elements of a core network CN node 1600 (e.g., an SMF node, an AMF node, etc.) of a communication network configured to provide cellular communication according to embodiments of inventive concepts. As shown, the CN node 1600 may include network interface circuitry 1607 (also referred to as a network interface) configured to provide communications with other nodes of the core network and/or the radio access network RAN. The CN node 1600 may also include a processing circuitry 1603 (also referred to as a processor) coupled to the network interface circuitry, and memory circuitry 1605 (also referred to as memory) coupled to the processing circuitry. The memory circuitry 1605 may include computer readable program code that when executed by the processing circuitry 1603 causes the processing circuitry to perform operations according to embodiments disclosed herein. According to other embodiments, processing circuitry 1603 may be defined to include memory so that a separate memory circuitry is not required.

As discussed herein, operations of the CN node 1600 may be performed by processing circuitry 1603 and/or network interface circuitry 1607. For example, processing circuitry 1603 may control network interface circuitry 1607 to transmit communications through network interface circuitry 1607 to one or more other network nodes and/or to receive communications through network interface circuitry from one or more other network nodes. Moreover, modules may be stored in memory 1605, and these modules may provide instructions so that when instructions of a module are executed by processing circuitry 1603, processing circuitry 1603 performs respective operations.

Figure 17:
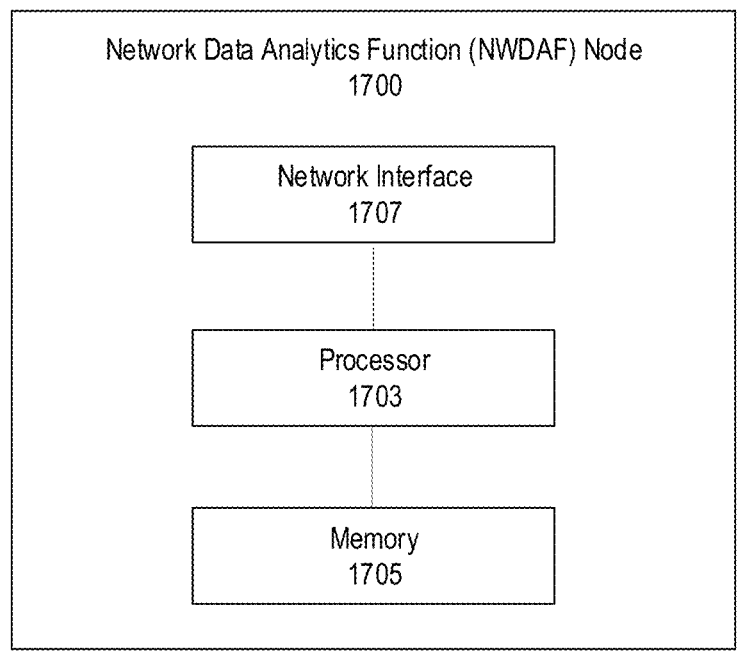
FIG. 17 is a block diagram illustrating an example of a network data analytics function ("NWDAF") node according to some embodiments of the present disclosure.

FIG. 17 is a block diagram illustrating elements of a network data analytics function ("NWDAF") node 1700 of a communication network configured to provide cellular communication according to embodiments of inventive concepts. The NWDAF node 1700 may be an example of the CN node 1600. As shown, the NWDAF node 1700 may include network interface circuitry 1707 (also referred to as a network interface) configured to provide communications with other nodes of the communication network include a core network and/or a radio access network ("RAN"). The NWDAF node 1700 may also include a processing circuitry 1703 (also referred to as a processor) coupled to the network interface circuitry, and memory circuitry 1705 (also referred to as memory) coupled to the processing circuitry. The memory circuitry 1705 may include computer readable program code that when executed by the processing circuitry 1703 causes the processing circuitry to perform operations according to embodiments disclosed herein. According to other embodiments, processing circuitry 1703 may be defined to include memory so that a separate memory circuitry is not required.

As discussed herein, operations of the NWDAF node 1700 may be performed by processing circuitry 1703 and/or network interface circuitry 1707. For example, processing circuitry 1703 may control network interface circuitry 1707 to transmit communications through network interface circuitry 1707 to one or more other network nodes and/or to receive communications through network interface circuitry from one or more other network nodes. Moreover, modules may be stored in memory 1705, and these modules may provide instructions so that when instructions of a module are executed by processing circuitry 1703, processing circuitry 1703 performs respective operations.

Figure 18:
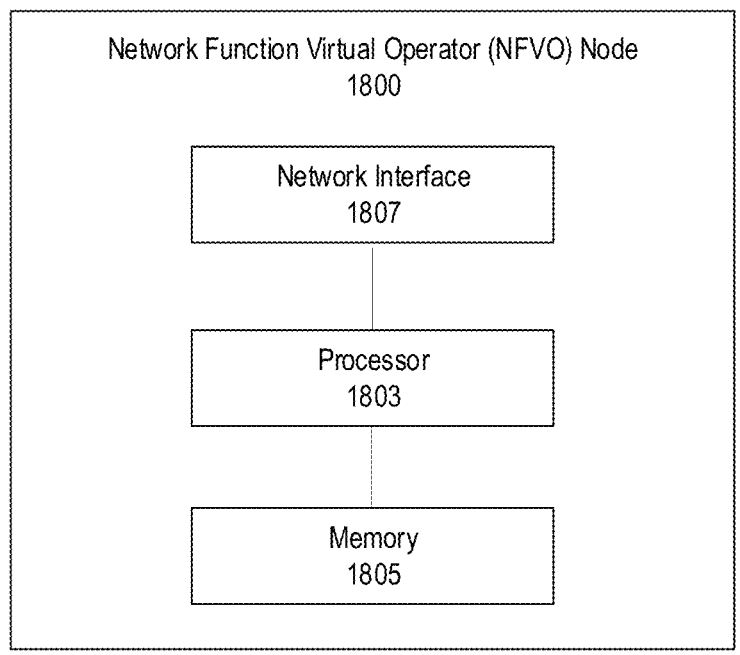
FIG. 18 is a block diagram illustrating an example of a network function virtual operator ("NFVO") node according to some embodiments of the present disclosure.

FIG. 18 is a block diagram illustrating elements of a network function virtual operator ("NFVO") node 1800 of a communication network configured to provide cellular communication according to embodiments of inventive concepts. The NFVO node 1800 may be an example of the CN node 1600. As shown, the NFVO node 1800 may include network interface circuitry 1807 (also referred to as a network interface) configured to provide communications with other nodes of the communication network include a core network and/or a radio access network ("RAN"). The NFVO node 1800 may also include a processing circuitry 1803 (also referred to as a processor) coupled to the network interface circuitry, and memory circuitry 1805 (also referred to as memory) coupled to the processing circuitry. The memory circuitry 1805 may include computer readable program code that when executed by the processing circuitry 1803 causes the processing circuitry to perform operations according to embodiments disclosed herein. According to other embodiments, processing circuitry 1803 may be defined to include memory so that a separate memory circuitry is not required.

As discussed herein, operations of the NFVO node 1800 may be performed by processing circuitry 1803 and/or network interface circuitry 1807. For example, processing circuitry 1803 may control network interface circuitry 1807 to transmit communications through network interface circuitry 1807 to one or more other network nodes and/or to receive communications through network interface circuitry from one or more other network nodes. Moreover, modules may be stored in memory 1805, and these modules may provide instructions so that when instructions of a module are executed by processing circuitry 1803, processing circuitry 1803 performs respective operations.

Operations of NWDAF node 1700 will now be discussed with reference to FIGS. 19-20 according to some embodiments of inventive concepts. For example, modules (also referred to as units) may be stored in memory 1705 of FIG. 17, and these modules may provide instructions so that when the instructions of a module are executed by processor 1703, processor 1703 performs respective operations of the flow charts of FIGS. 19-20.

Figure 19:
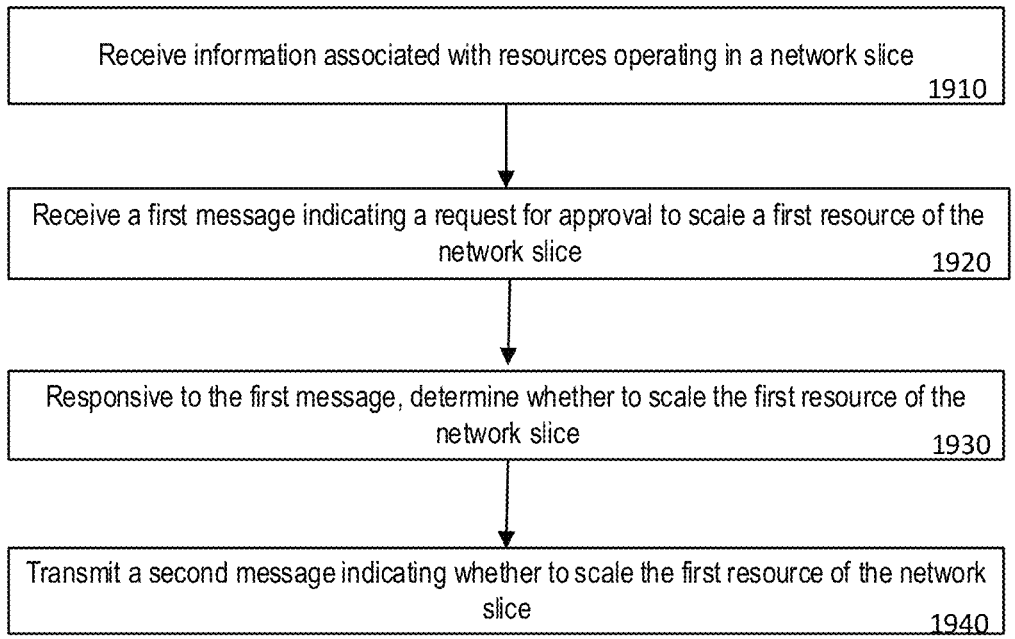
FIGS. 19-20 are flow charts illustrating an example of a process performed by a NWDAF according to some embodiments of the present disclosure.

FIG. 19 depicts a flow chart illustrating an example of a process for operating a network node in a communication network node to evaluate whether to scale a first resource of a network slice of the communication network. Although the process of FIG. 19 is described below in reference to the network node being NWDAF node 1700, the process may be performed by any suitable network node.

At block 1910, processor 1703 receives, via network interface 1707, information associated with resources operating in a network slice. In some embodiments, the resources may include a core network resource of the network slice. The core network resource can include one of an access management function, AMF, resource, a session management function, SMF, resource, a user plane function, UPF, resource, a policy control function, PCF, resource, an authentication server function, AUSF, resource, a united data management, UDM, resource, a network repository function, NRF, resource, a network exposure function, NEF, resource, a transport resource, a cloud infrastructure resource, or any other suitable core network resource. In additional or alternative embodiments, the resources can include a radio access network resource. In additional or alternative embodiments, the resources can include a resource outside the communication network. For example, the resources can include at least one of an internet exchange point resource, a service provide infrastructure resource, and/or a media server resource. In additional or alternative embodiments, the resources can include a user equipment resource. For example, the resources can include at least one of a streaming resource, a modem resource, and/or a screen size. In additional or alternative embodiments, the information regarding the resources can include information regarding a load and/or an available capacity of a specific resource.

At block 1920, processor 1703 receives, via network interface 1707, a first message indicating a request for approval to scale a first resource of the network slice. The first message may be received from another network node (e.g., NFVO node 1800). In some embodiments, the first resource may be a resource for which the processor received information about in block 1910. In some embodiments, the first resource can be of a different type than a second resource, which the processor 1703 may have received information about in block 1910. In additional or alternative embodiments, the first resource may include a core network resource of the network slice. The core network resource can include one of an access management function, AMF, resource, a session management function, SMF, resource, a user plane function, UPF, resource, a policy control function, PCF, resource, an authentication server function, AUSF, resource, a united data management, UDM, resource, a network repository function, NRF, resource, a network exposure function, NEF, resource, a transport resource, a cloud infrastructure resource, or any other suitable core network resource. The second resource may include another core network resource different than the first resource. In additional or alternative embodiments, the second resource can include a radio access network resource. In additional or alternative embodiments, the second resource can include a resource outside the communication network. For example, the second resource can include at least one of an internet exchange point resource, a service provider infrastructure resource, and/or a media server resource. In additional or alternative embodiments, the second resource can include a user equipment resource (e.g., a streaming resource, a modem resource, and/or a screen size).

At block 1930, responsive to receiving the first message, processor 1703 determines whether to scale the first resource of the network slice. In some embodiments, the processor 1703 can determine whether to scale the first resource of the network slice based on the information received in block 1910.

At block 1940, processor 1703 transmits, via network interface 1707, a second message indicating whether to scale the first resource of the network slice. The processor 1703 can transmit the second message to the network node (e.g., NFVO node 1800) from which the first message was received.

Figure 20:
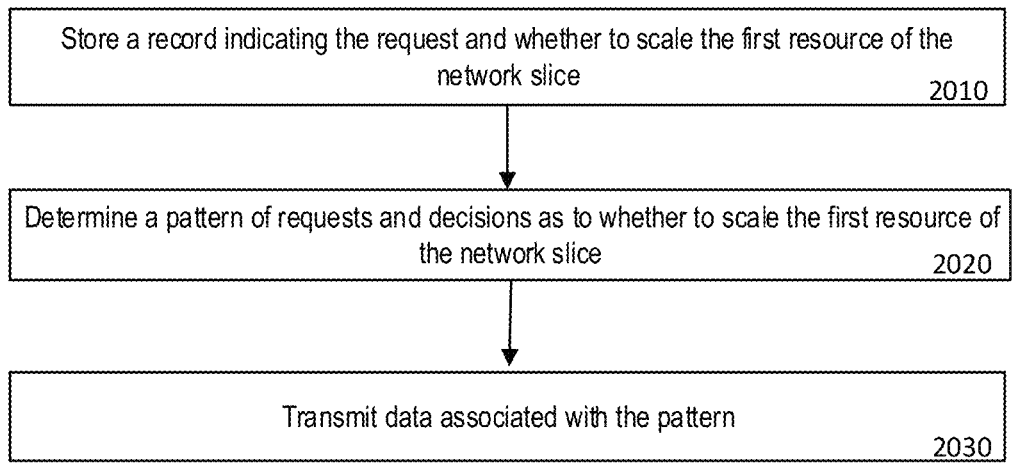

FIG. 20 depicts a flow chart illustrating a further example of the process in depicted in FIG. 19 for operating a network node in a communication network to indicate a pattern of congestion of a network slice. Although the process of FIG. 20 is described below in reference to the NWDAF node 1700, the process may be performed by any suitable network node.

At block 2010, processor 1703 stores, in memory 1705, a record indicating the request and whether to scale the first resource of the network slice. In some embodiments, the record can be maintained for a predetermined period of time (e.g., days, months, or years) along with a plurality of other records indicating other requests and other decisions whether to scale various resources of the network slice.

At block 2020, processor 1703 determines a pattern of requests and decisions as to whether to scale the first resource of the network slice. In some embodiments, the processor 1703 determines that the network slice has become congested every day at a specific time and, that in response to the congestion, a request is made and granted every day to scale the first resource. In additional or alternative embodiments, the processor 1703 determines that scaling the first resource everyday at the specific time results in a request for scaling of another resource in the network slice.

At block 2030, processor 1703 transmits data associated with the pattern. In some embodiments, the processor 1703 transmits the data to an operator of the network slice. For example, the processor 1703 may notify the operator that the first resource should automatically be scaled at a specific time every day. In additional or alternative embodiments, the processor 1703 transmits the data associated with the pattern to a resource outside the communication network. For example, the processor 1703 may notify an application function outside of the communication network that a pattern of congestion is occurring related to the application function and that scaling the first resource will not improve user experience.

Although the processes illustrated in FIGS. 19-20 are described as being performed by the processor 1703 of NWDAF 1700, the processes may be performed by any suitable first network node communicatively coupled to any suitable second network node. In some examples, the first network node may be a network node capable of determining whether to scale a resource in a network slice. In additional or alternative examples, the first network node is a core network node. In additional or alternative examples, the first network node may be a NWDAF node. In additional or alternative examples, the first network node may be an independent database that stores information about resources and/or congestion in a network slice and that is communicatively coupled to the second network node. The first network node may be a different type than the second network node. For example, the first network node may be a NWDAF node and the second network node may be a NFVO node. Furthermore, various operations of FIGS. 19-20 may be optional with respect to some embodiments.

Operations of NFVO node 1800 will now be discussed with reference to FIGS. 21-22 according to some embodiments of inventive concepts. For example, modules (also referred to as units) may be stored in memory 1805 of FIG. 18, and these modules may provide instructions so that when the instructions of a module are executed by processor 1803, processor 1803 performs respective operations of the flow charts of FIGS. 21-22.

Figure 21:
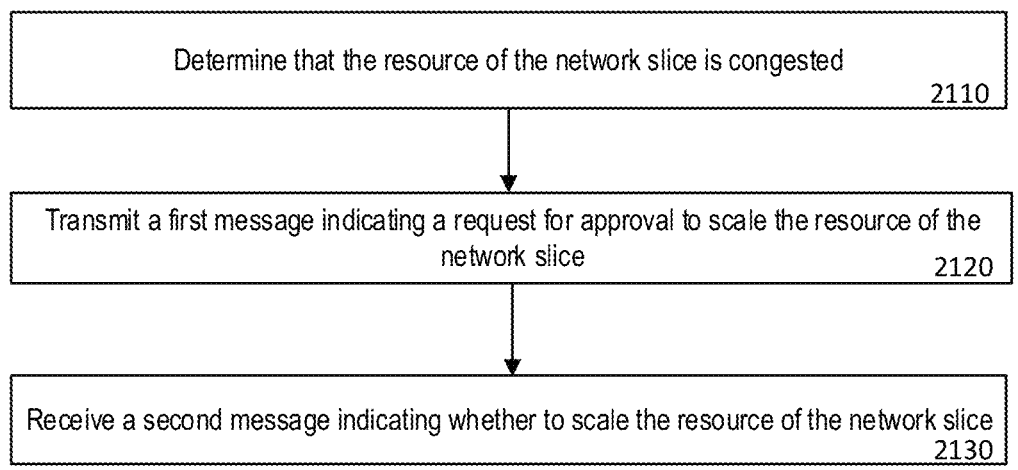
FIGS. 21-22 are a flow charts illustrating an example of a process performed by a NFVO according to some embodiments of the present disclosure.

FIG. 21 depicts a flow chart illustrating an example of a process for a network node in a communication network to indicate a pattern of congestion of a network slice. Although the process of FIG. 21 is described below in reference to the NFVO node 1800, the process may be performed by any suitable network node.

At block 2110, processor 1803 determines that a resource of the network slice is congested. In some embodiments, the resource can be a core network resource of the network slice. For example, the resource can be one of an access management function, AMF, resource, a session management function, SMF, resource, a user plane function, UPF, resource, a policy control function, PCF, resource, an authentication server function, AUSF, resource, a united data management, UDM, resource, a network repository function, NRF, resource, a network exposure function, NEF, resource, a transport resource, or a cloud infrastructure resource.

At block 2120, processor 1803 transmits, via network interface 1807, a first message indicating a request for approval to scale the resource of the network slice.

At block 2130, processor 1803 receives, via network interface 1807, a second message indicating whether to scale the resource of the network slice.

Figure 22:
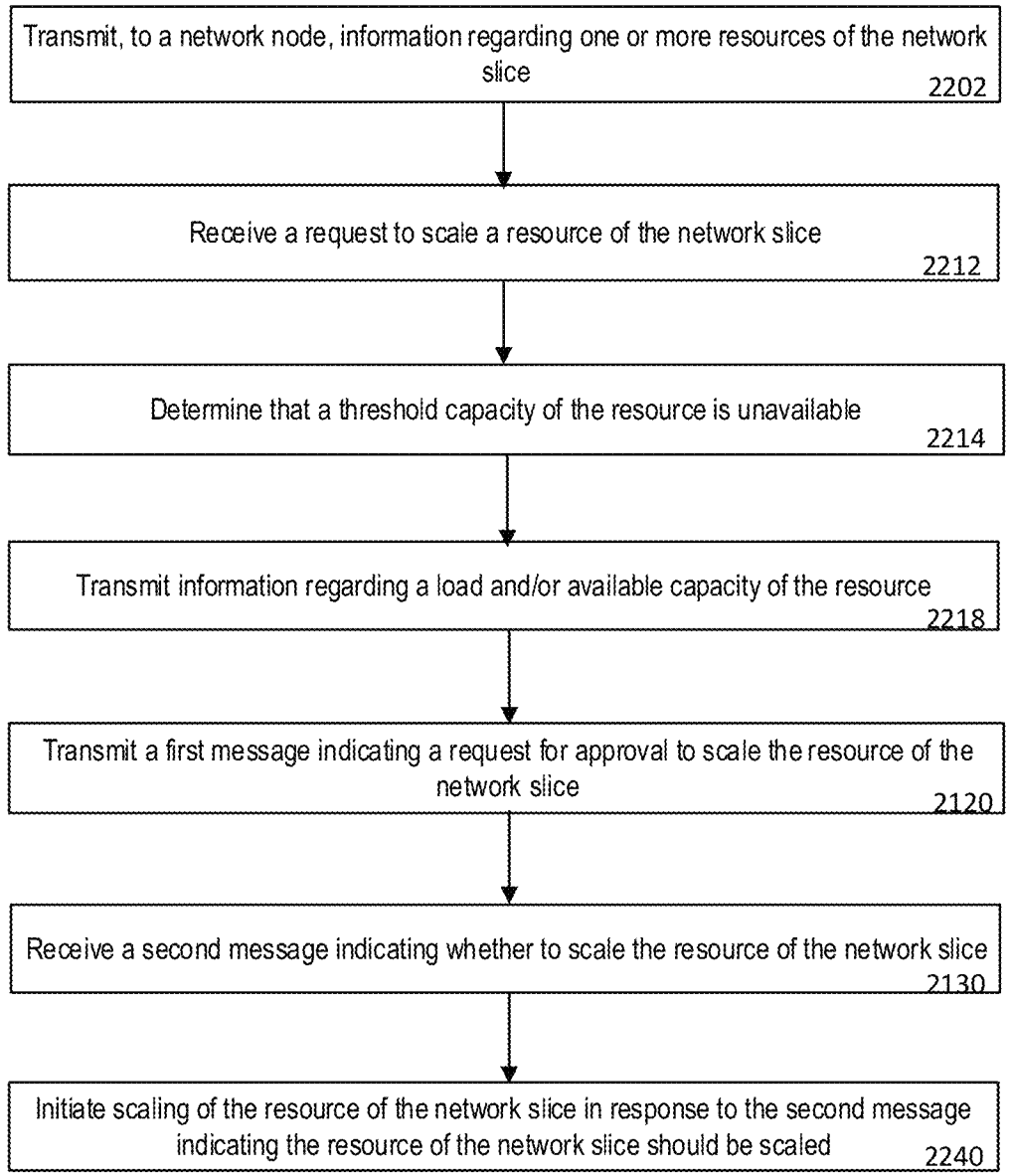

FIG. 22 depicts a flow chart illustrating an example of another process for a network node in a communication network to indicate a pattern of congestion of a network slice. Although the process of FIG. 22 is described below in reference to the NFVO node 1800, the process may be performed by any suitable network node.

At block 2202, processor 1803 transmits, via network interface 1807, to a network node (e.g., NWDAF 1700), information regarding one or more resources of the network slice. In some embodiments, the information is related to the congested resource. In additional or alternative embodiments, the information is related to a second resource that is a different type than the congested resource.

At block 2212, processor 1803 receives, via network interface 1807, a request to scale a resource of the network slice. In some embodiments, the processor determines that the resource is congested in response to receiving the request to scale the resource.

At block 2214, processor 1803 determines that a threshold capacity of the resource is unavailable. In other embodiments, the processor 1803 can determine that a threshold capacity is available and scale the resource without requesting approval.

At block 2218, processor 1803 transmits, via network interface 1807, information regarding a load and/or available capacity of the resource.

Blocks 2110 and 2120 of FIG. 22 are the same as blocks 2110 and 2120 of FIG. 21. The processor 1803 can transmit a first message indicating a request for approval to scale the resource of the network slice and the processor 1803 can receive a second message indicating whether to scale the resource of the network slice.

At block 2240, processor 1803 initiates scaling of the resource of the network slice in response to the second message indicating the resource of the network slice should be scaled.

Although the processes illustrated in FIGS. 21-22 are described as being performed by the processor 1803 of NFVO 1800, the processes may be performed by any suitable first network node communicatively coupled to any suitable second network node. In some examples, the first network node may be a network node capable of requesting approval to scale a resource in a network slice. In additional or alternative examples, the first network node may be a network node capable of initiating scaling of a resource in a network slice. In additional or alternative examples, the first network node may be a NFVO node. In additional or alternative examples, the first network node may be a VNF node. The first network node may be a different type than the second network node. For example, the first network node may be a NFVO node and the second network node may be a NWDAF node. Furthermore, various operations of FIGS. 21-22 may be optional with respect to some embodiments.

Example Embodiments are discussed below. Reference numbers/letters are provided in parenthesis by way of example/illustration without limiting example embodiments to particular elements indicated by reference numbers/letters Embodiment 1. A method of operating a first network node in a communication network, to evaluate whether to scale a first resource of a network slice of the communication network, the embodiment comprising: receiving (1920), from a second network node of the communication network, a first message indicating a request for approval to scale the first resource of the network slice; responsive to receiving the first message, determining (1930) whether to scale the first resource of the network slice based on information regarding a second resource, wherein the first and second resources are of different types; and transmitting (1940), to the second network node, a second message indicating whether to scale the first resource of the network slice based on determining whether to scale the first resource of the network slice.

Embodiment 2. The method of Embodiment 1, wherein the first resource comprises a core network resource of the network slice.

Embodiment 3. The method of Embodiment 2, wherein the core network resource comprises one of an access management function, AMF, resource, a session management function, SMF, resource, a user plane function, UPF, resource, a policy control function, PCF, resource, an authentication server function, AUSF, resource, a united data management, UDM, resource, a network repository function, NRF, resource, a network exposure function, NEF, resource, a transport resource, or a cloud infrastructure resource.

Embodiment 4. The method of any of Embodiments 2-3, wherein the core network resource is a first core network resource, and wherein the second resource comprises a second core network resource of the network slice, wherein the first and second core network resources are of different types.

Embodiment 5. The method of Embodiment 4, wherein the second core network resource comprises one of an AMF resource, a SMF resource, a UPF resource, a PCF resource, an AUSF resource, a UDM resource, a NRF resource, a NEF resource, a transport resource, or a cloud infrastructure resource different than the first core network resource.

Embodiment 6. The method of any of Embodiments 1-3, wherein the second resource comprises a radio access network, RAN, resource.

Embodiment 7. The method of any of Embodiments 1-3, wherein the second resource comprises a resource outside the communication network.

Embodiment 8. The method of Embodiment 7, wherein the second resource comprises at least one of an internet exchange point resource, a service provider infrastructure resource, and/or a media server resource.

Embodiment 9. The method of any of Embodiments 1-3, wherein the second resource comprises a user equipment resource.

Embodiment 10. The method of Embodiment 9, wherein the user equipment resource comprises at least one of a streaming resource, a modem resource, and/or screen size.

Embodiment 11. The method of any of Embodiments 1-10, further comprising: receiving (1910), from the second network node of the communication network, the information regarding the second resource.

Embodiment 12. The method of any of Embodiment 11, wherein the information regarding the second resource comprises information regarding a load and/or an available capacity of the second resource.

Embodiment 13. The method of any of Embodiments 1-12, further comprising: receiving (1910), from the second network node of the communication network, additional information regarding a load and/or available capacity of the first resource.

Embodiment 14. The method of any of Embodiments 1-13, further comprising: storing (2010), by the first network node, a record indicating the request and whether to scale the first resource of the network slice; and determining (2020) a pattern of requests and decisions as to whether to scale the first resource of the network slice.

Embodiment 15. The method of Embodiment 14, further comprising: responsive to determining the pattern, transmitting (2030) data associated with the pattern to an operator of the network slice.

Embodiment 16. The method of Embodiment 14, further comprising: responsive to determining the pattern, transmitting (2030) data associated with the pattern to a resource outside the communication network.

Embodiment 17. A method of operating a first network node, in a communication network to respond to congestion in a resource of a network slice of the communication network, the method comprising: determining (2110) that the resource of the network slice is congested; responsive to determining that the resource of the network slice is congested, transmitting (2120) a first message to a second network node of the communication network, the first message indicating a request for approval to scale the resource of the network slice; and receiving (2130) a second message from the second network node, the second message indicating whether to scale the resource of the network slice in response to the first message.

Embodiment 18. The method of Embodiment 17, wherein the resource is a first resource of the network slice, the method further comprising: transmitting (2202) to the second network node information regarding a second resource, wherein the first and second resources are of different types.

Embodiment 19. The method of Embodiment 18, wherein the first resource comprises a core network resource of the network slice.

Embodiment 20. The method of Embodiment 19, wherein the core network resource comprises one of an access management function, AMF, resource, a session management function, SMF, resource, a user plane function, UPF, resource, a policy control function, PCF, resource, an authentication server function, AUSF, resource, a united data management, UDM, resource, a network repository function, NRF, resource, a network exposure function, NEF, resource, a transport resource, or a cloud infrastructure resource.

Embodiment 21. The method of any of Embodiments 19-20, wherein the core network resource is a first core network resource, and wherein the second resource comprises a second core network resource of the network slice, wherein the first and second core network resources are of different types.

Embodiment 22. The method of Embodiments 21, wherein the second core network resource comprises one of an AMF resource, a SMF resource, a UPF resource, a PCF resource, an AUSF resource, a UDM resource, a NRF resource, a NEF resource, a transport resource, or a cloud infrastructure resource, different than the first core network resource.

Embodiment 23. The method of any of Embodiments 17-22, wherein determining comprises: receiving (2212) a request to scale the resource; and responsive to receiving the request to scale the resource, determining (2214) that a threshold capacity of the resource is unavailable, wherein transmitting the first message comprises transmitting the first message responsive to determining that the threshold capacity of the resource is unavailable.

Embodiment 24. The method of any of Embodiments 17-23, wherein the second message indicates the resource of the network slice should be scaled, the method further comprising: initiating (2240) scaling of the resource of the network slice in response to the second message indicating the resource of the network slice should be scaled.

Embodiment 25. The method of any of Embodiments 17-24, further comprising: responsive to determining that the resource of the network slice is congested, transmitting (2218), to the second network node of the communication network, information regarding a load and/or available capacity of the resource.

Embodiment 26. A network node (1700) that is adapted to perform according to any of Embodiments 1-16.

Embodiment 27. A network node (1800) that is adapted to perform according to any of Embodiments 17-25.

Embodiment 28. A network node (1700) comprising: a processor (1703); and memory (1705) coupled with the processor, wherein the memory comprises instructions that when executed by the processor cause the processor to perform operations according to any of Embodiments 1-16.

Embodiment 29. A network node (1800) comprising: a processor (1803); and memory (1805) coupled with the processor, wherein the memory comprises instructions that when executed by the processor cause the processor to perform operations according to any of Embodiments 17-25.

Explanations for abbreviations from the above disclosure are provided below.

| Abbreviation | Explanation |
| --- | --- |
| 3GPP | 3rd Generation Partnership Project |
| 5G | 5th Generation |
| AMF | Access and Mobility management Function |
| CHO | Conditional Handover |
| CRM | Customer Relationship Management |
| CSP | Connectivity Service Provider (e.g., mobile operator) |
| eNB | Evolved NodeB |
| gNB | Radio base station in NR. |
| HO | Handover |
| ISP | Internet Service Provider |
| IPX | Internet Packet Exchange Point |
| LTE | Long Term Evolution |
| MME | Mobility Management Entity |
| NAS | Non Access Stratum |
| NF | Network Function |
| NR | New Radio |
| NWDAF | Network Data Analytics Function. |
| RAN | Radio Access Network |
| RAT | Radio Access Technology |
| RRC | Radio Resource Control |
| SPR | Service Provider Infrastructure |
| SRVCC | Single Radio Voice Call Continuity |
| UE | User Equipment |
| UTRAN | Universal Terrestrial Radio Access Network |
| VNF | Virtualized Network Function |
| OTT | Over The Top application |
| VNFI | Virtualized Network Function Infrastructure |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 26:
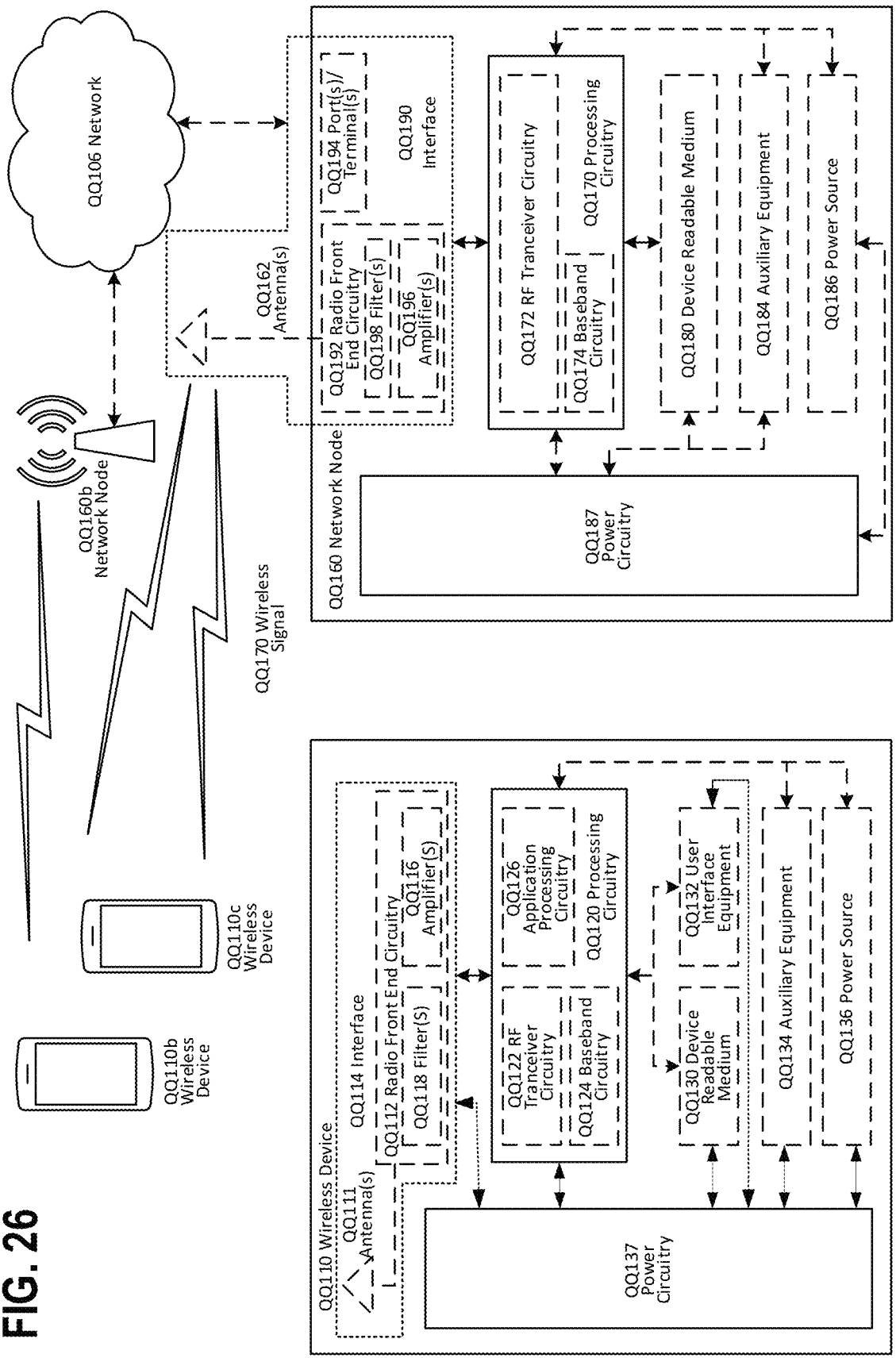
FIG. 26 is a block diagram of a wireless network in accordance with some embodiments.

FIG. 26: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 26. For simplicity, the wireless network of FIG. 26 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 26, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 26 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 26 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 27:
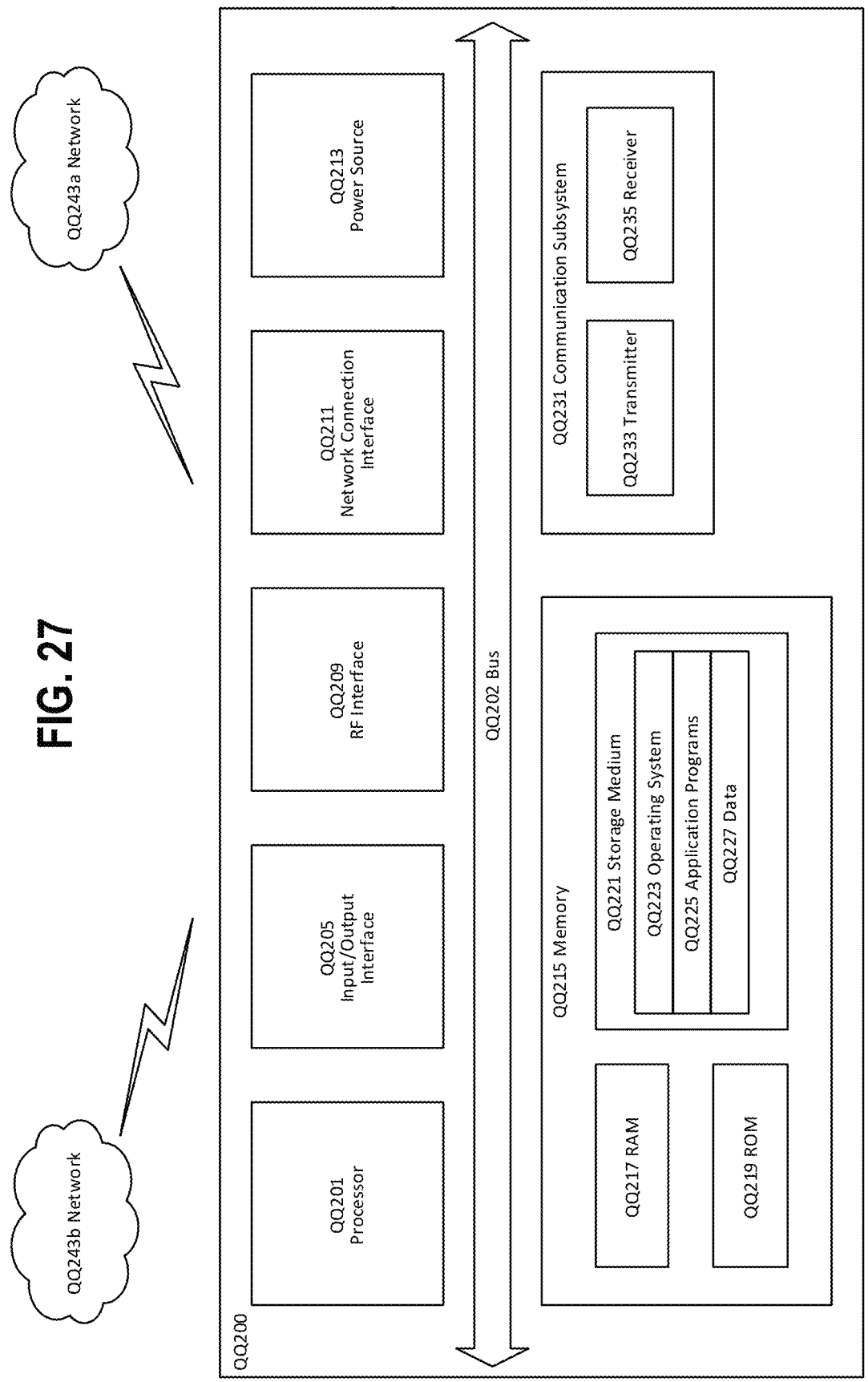
FIG. 27 is a block diagram of a user equipment in accordance with some embodiments

FIG. 27: User Equipment in accordance with some embodiments

FIG. 27 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 27, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 27 is a UE, the components discussed herein are equally applicable to a WD, and vice-versa.

In FIG. 27, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 27, or only a subset of the components. The level of integration between the components may vary from one UE to another UE. Further, certain UEs may contain multiple instances of a component, such as multiple processors, memories, transceivers, transmitters, receivers, etc.

In FIG. 27, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 27, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 27, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 28:
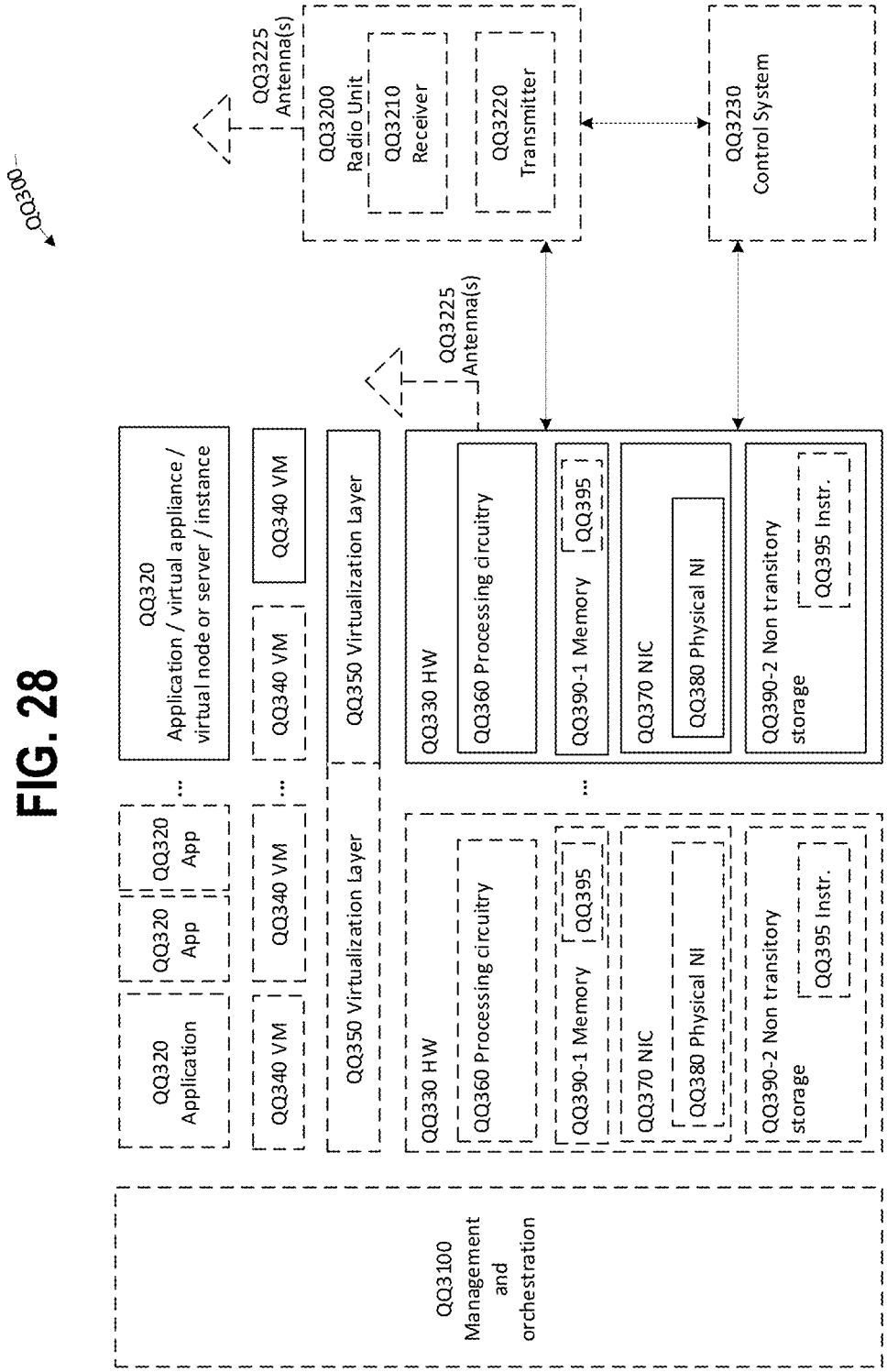
FIG. 28 is a block diagram of a virtualization environment in accordance with some embodiments.

FIG. 28: Virtualization environment in accordance with some embodiments

FIG. 28 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 28, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 28.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 29:
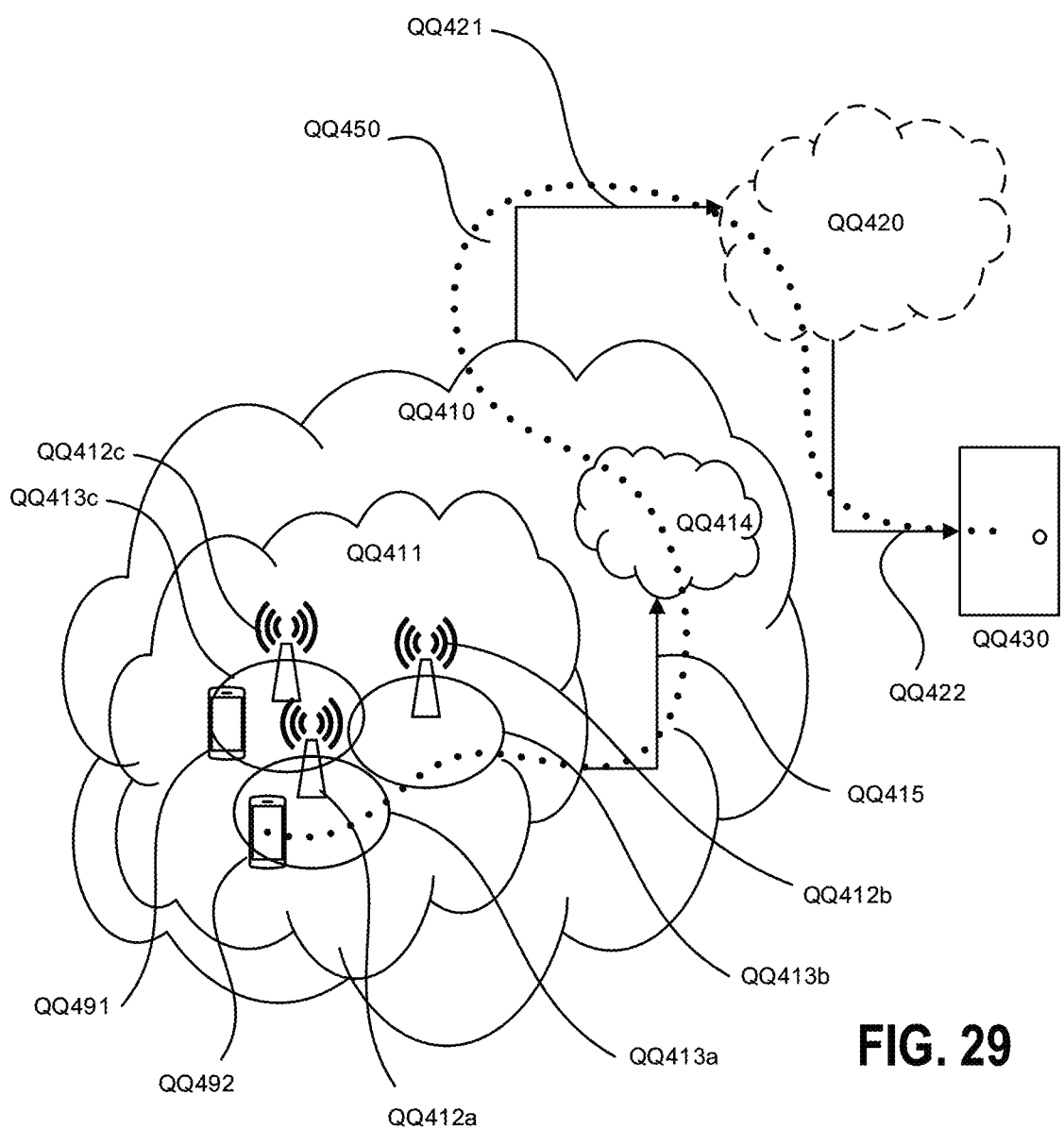
FIG. 29 is a block diagram of a telecommunication network connected via an intermediate network to a host computer in accordance with some embodiments.

FIG. 29: Telecommunication network connected via an intermediate network to a host computer in accordance with some embodiments.

With reference to FIG. 29, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 29 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 30:
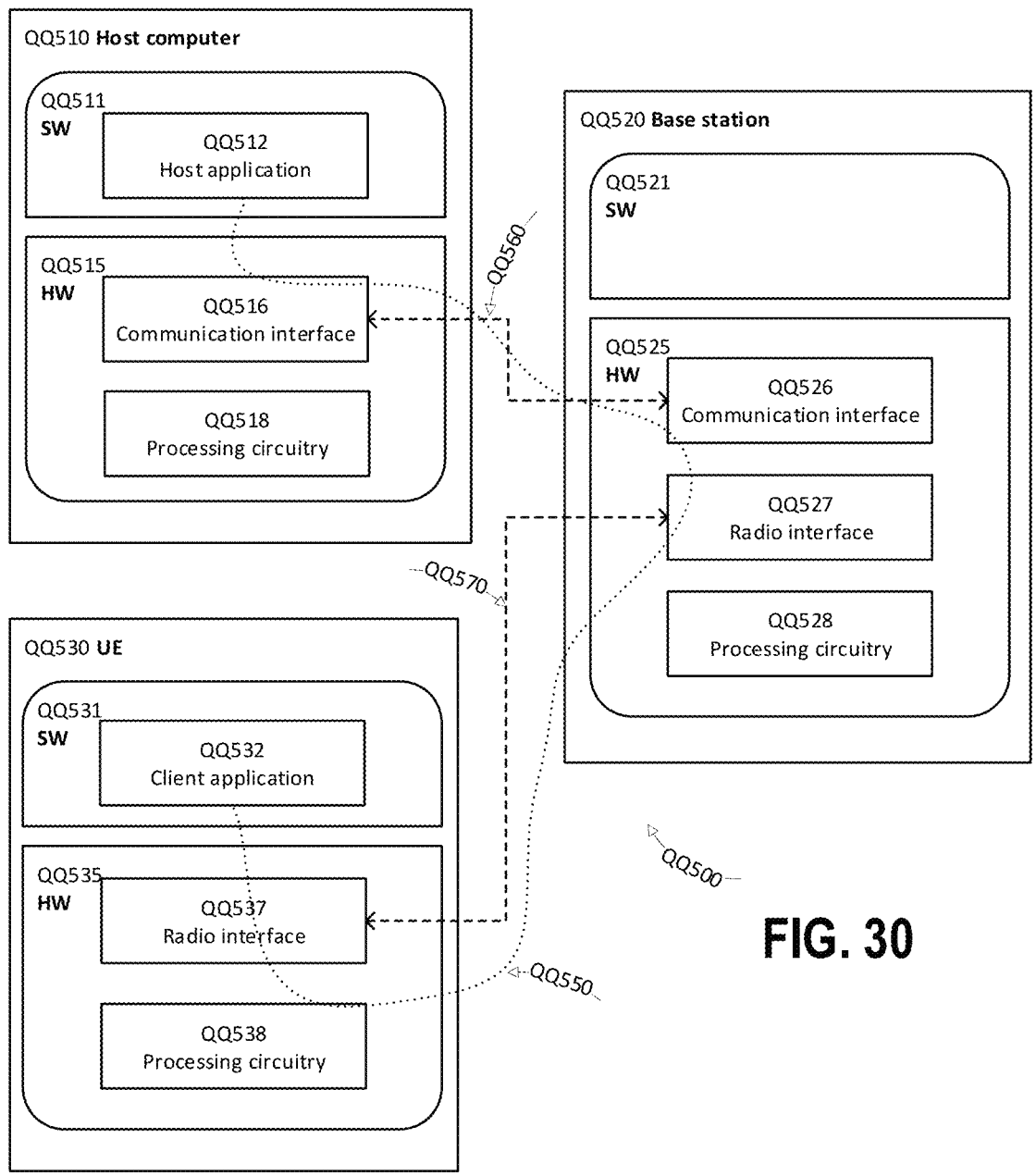
FIG. 30 is a block diagram of a host computer communicating via a base station with a user equipment over a partially wireless connection in accordance with some embodiments.

FIG. 30: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 30. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 30) served by base station QQ520. Communication interface QQ526 may be configured to facilitate connection QQ560 to host computer QQ510. Connection QQ560 may be direct or it may pass through a core network (not shown in FIG. 30) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 30 may be similar or identical to host computer QQ430, one of base stations QQ412a, QQ412b, QQ412c and one of UEs QQ491, QQ492 of FIG. 29, respectively. This is to say, the inner workings of these entities may be as shown in FIG. 30 and independently, the surrounding network topology may be that of FIG. 29.

In FIG. 30, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 31:
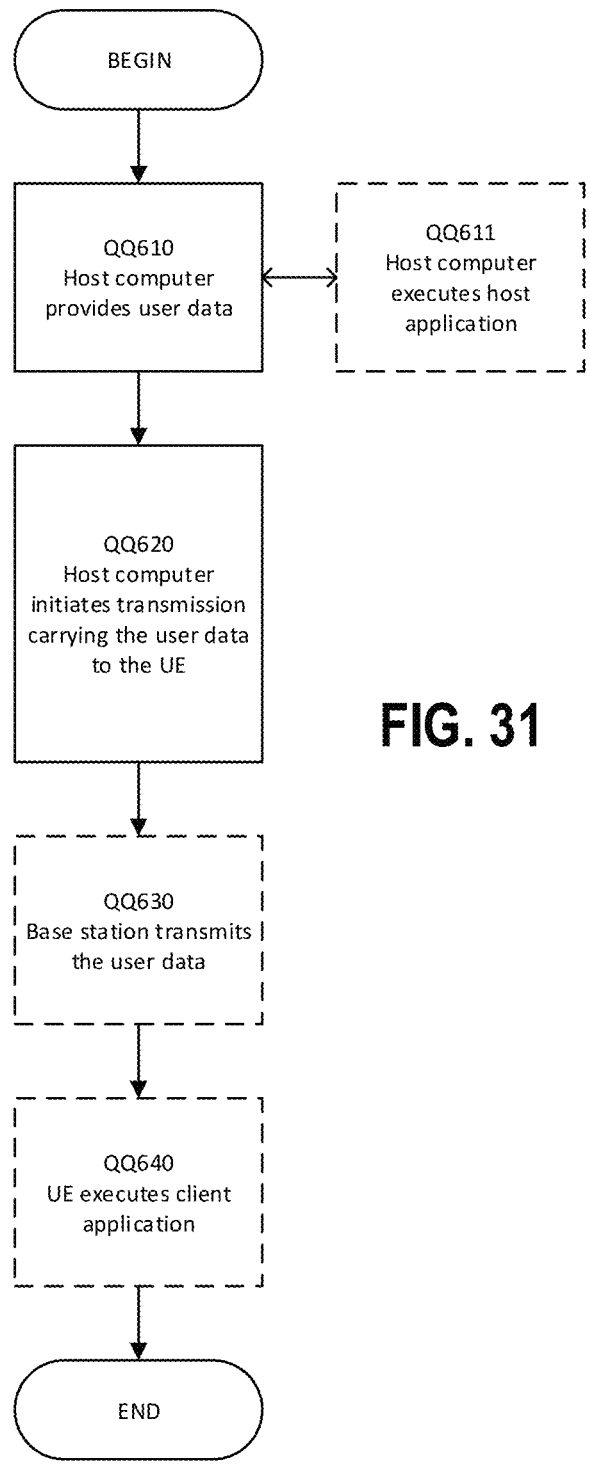
FIG. 31 is a block diagram of methods implemented in a communication system including a host computer, a base station, and a user equipment in accordance with some embodiments.

FIG. 31: Methods implemented in a communication system including a host computer, a base station and a user equipment in accordance with some embodiments.

FIG. 31 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 31 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 32:
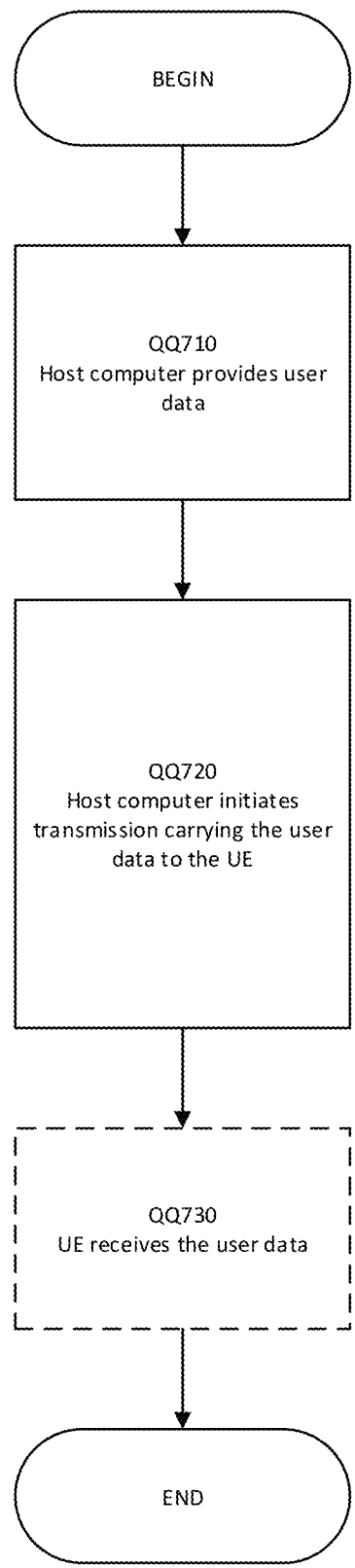
FIG. 32 is a block diagram of methods implemented in a communication system including a host computer, a base station, and a user equipment in accordance with some embodiments.

FIG. 32: Methods implemented in a communication system including a host computer, a base station and a user equipment in accordance with some embodiments.

FIG. 32 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 32 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 33:
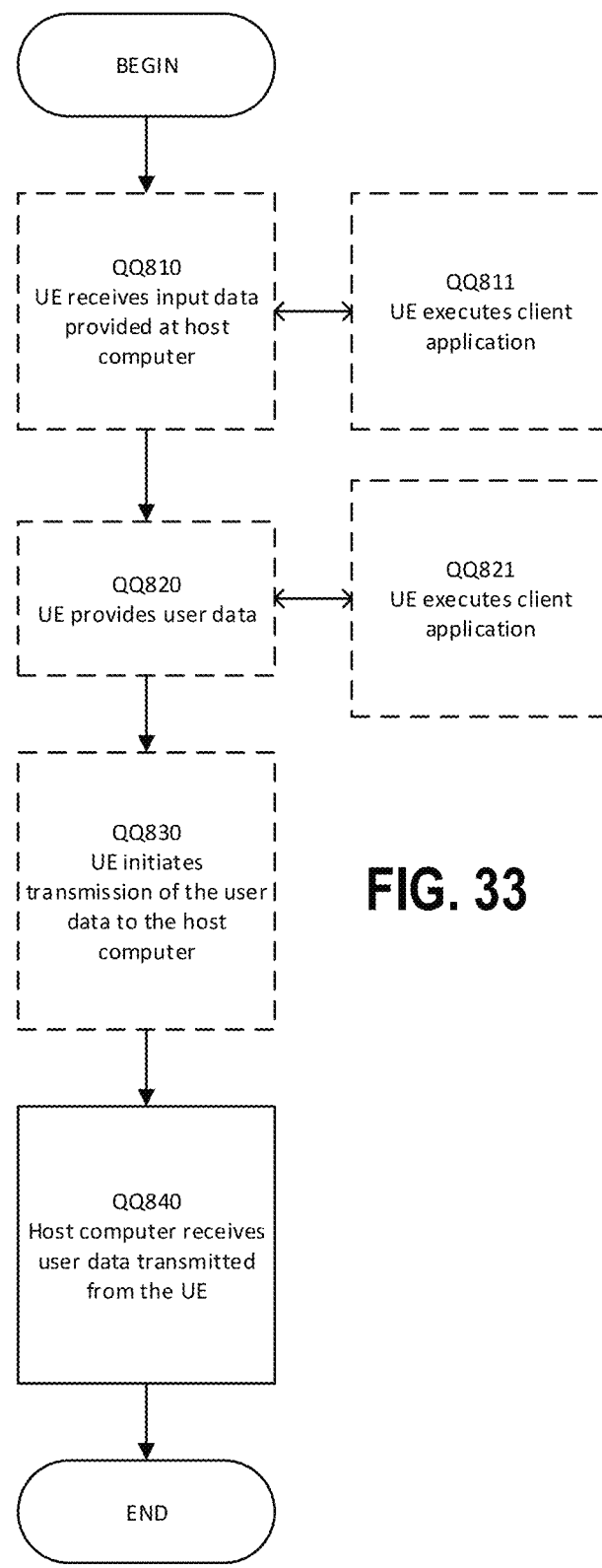
FIG. 33 is a block diagram of methods implemented in a communication system including a host computer, a base station, and a user equipment in accordance with some embodiments.

FIG. 33: Methods implemented in a communication system including a host computer, a base station and a user equipment in accordance with some embodiments.

FIG. 33 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 33 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 34:
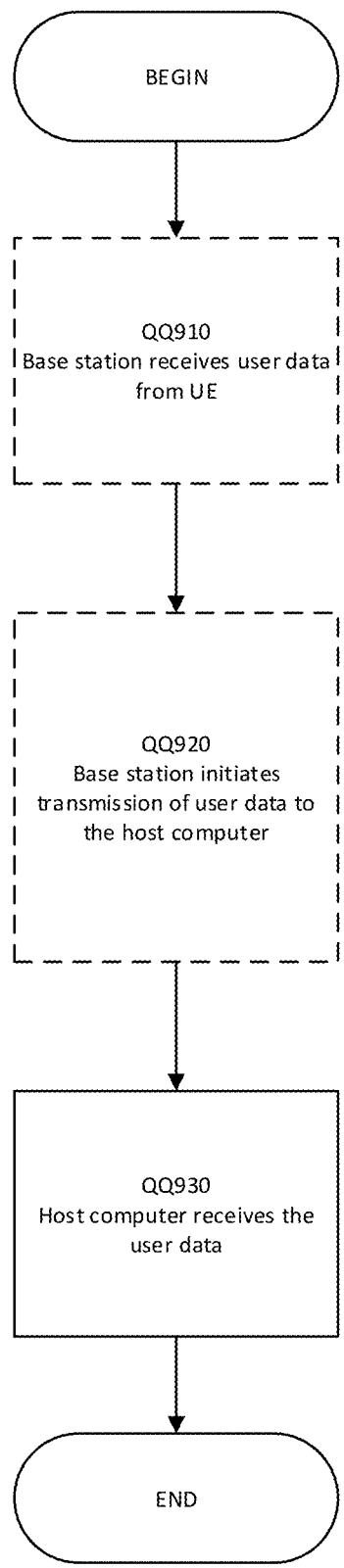
FIG. 34 is a block diagram of methods implemented in a communication system including a host computer, a base station, and a user equipment in accordance with some embodiments.

FIG. 34: Methods implemented in a communication system including a host computer, a base station and a user equipment in accordance with some embodiments.

FIG. 34 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 34 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a network data analytics functions, NWDAF node in a communication network, to evaluate whether to scale a first resource of a network slice of the communication network, the method comprising:
receiving, from a network function virtual operator, NFVO, node of the communication network, a first message indicating a request for approval to scale the first resource of the network slice;
responsive to receiving the first message, determining whether to scale the first resource of the network slice based on information regarding a second resource, wherein the first and second resources are of different types; and
transmitting, to the NFVO node, a second message indicating whether to scale the first resource of the network slice based on determining whether to scale the first resource of the network slice.

2. The method of claim 1, wherein the first resource comprises a core network resource of the network slice.

3. The method of claim 2, wherein the core network resource comprises one of an access management function, AMF, resource, a session management function, SMF, resource, a user plane function, UPF, resource, a policy control function, PCF, resource, an authentication server function, AUSF, resource, a united data management, UDM, resource, a network repository function, NRF, resource, a network exposure function, NEF, resource, a transport resource, or a cloud infrastructure resource.

4. The method of claim 2, wherein the core network resource is a first core network resource,
wherein the second resource comprises a second core network resource of the network slice,
wherein the first and second core network resources are of different types, and
wherein the second core network resource comprises one of an AMF resource, a SMF resource, a UPF resource, a PCF resource, an AUSF resource, a UDM resource, a NRF resource, a NEF resource, a transport resource, or a cloud infrastructure resource different than the first core network resource.

5. The method of claim 1, wherein the second resource comprises a radio access network, RAN, resource.

6. The method of claim 1, wherein the second resource comprises a resource outside the communication network, and
wherein the second resource comprises at least one of an internet exchange point resource, a service provider infrastructure resource, and/or a media server resource.

7. The method of claim 1, wherein the second resource comprises a user equipment resource, and
wherein the user equipment resource comprises at least one of a streaming resource, a modem resource, and/or screen size.

8. The method of claim 1, further comprising:
receiving, from the NFVO node of the communication network, the information regarding the second resource,
wherein the information regarding the second resource comprises information regarding a load and/or an available capacity of the second resource.

9. The method of claim 1, further comprising:
receiving, from the NFVO node of the communication network, additional information regarding a load and/or available capacity of the first resource.

10. The method of claim 1, further comprising:
storing, by the NWDAF node, a record indicating the request and whether to scale the first resource of the network slice; and
determining a pattern of requests and decisions as to whether to scale the first resource of the network slice.

11. The method of claim 10, further comprising:
responsive to determining the pattern, transmitting data associated with the pattern to at least one of: an operator of the network slice; and a resource outside the communication network.

12. The method of claim 1, wherein receiving the first message comprises receiving:
an indication the first resource of the network slice is congested,
an indication that the second network node has received a request to scale the first resource;

an indication that the second network node has determined that a threshold capacity of the first resource is unavailable.

13. A method of operating a network function virtual operation, NFVO, node, in a communication network to respond to congestion in a resource of a network slice of the communication network, the method comprising:
- determining that the resource of the network slice is congested;
- responsive to determining that the resource of the network slice is congested, transmitting a first message to a network data analytics function, NWDAF, node of the communication network, the first message indicating a request for approval to scale the resource of the network slice; and
- receiving a second message from the NWDAF node, the second message indicating whether to scale the resource of the network slice in response to the first message.

14. The method of claim 13, wherein the resource is a first resource of the network slice, the method further comprising:
- transmitting to the NWDAF node information regarding a second resource, wherein the first and second resources are of different types,
- wherein the first resource comprises a core network resource of the network slice.

15. The method of claim 14, wherein the core network resource is a first core network resource,
- wherein the second resource comprises a second core network resource of the network slice,
- wherein the first and second core network resources are of different types,
- wherein the core network resource comprises one of an access management function, AMF, resource, a session management function, SMF, resource, a user plane function, UPF, resource, a policy control function, PCF, resource, an authentication server function, AUSF, resource, a united data management, UDM, resource, a network repository function, NRF, resource, a network exposure function, NEF, resource, a transport resource, or a cloud infrastructure resource, and
- wherein the second core network resource comprises one of an AMF resource, a SMF resource, a UPF resource, a PCF resource, an AUSF resource, a UDM resource, a NRF resource, a NEF resource, a transport resource, or a cloud infrastructure resource, different than the first core network resource.

16. The method of claim 13, wherein determining that the resource of the network slice is congested comprises:
- receiving a request to scale the resource; and
- responsive to receiving the request to scale the resource, determining that a threshold capacity of the resource is unavailable,
- wherein transmitting the first message comprises transmitting the first message responsive to determining that the threshold capacity of the resource is unavailable.

17. The method of claim 13, wherein the second message indicates the resource of the network slice should be scaled, the method further comprising:
- initiating scaling of the resource of the network slice in response to the second message indicating the resource of the network slice should be scaled.

18. The method of claim 13, further comprising:
- responsive to determining that the resource of the network slice is congested, transmitting, to the NWDAF node of the communication network, information regarding a load and/or available capacity of the resource.

19. A first network node operatable in in a communication network to respond to congestion in a resource of a network slice of the communications network, the first network node comprising:
- a processor; and
- memory coupled with the processor, wherein the memory comprises instructions that when executed by the processor cause the processor to perform operations, the operations comprising:
  - determining that the resource of the network slice is congested;
  - responsive to determining that the resource of the network slice is congested, transmitting a first message to a second network node of the communication network, the first message indicating a request for approval to scale the resource of the network slice, the first network node being separate from the network slice; and
  - receiving a second message from the second network node, the second message indicating whether to scale the resource of the network slice in response to the first message,
  - wherein determining that the resource of the network slice is congested comprises:
    - receiving a request to scale the resource; and
    - responsive to receiving the request to scale the resource, determining that a threshold capacity of the resource is unavailable, and
  - wherein transmitting the first message comprises transmitting the first message responsive to determining that the threshold capacity of the resource is unavailable.

20. The first network node of claim 19, wherein the first network node is a network function virtual operation, NFVO, node, and
- wherein the second network node is a network data analytics function data analytics function, NWDAF, node.

* * * * *